United States Patent [19]

Rossi

[11] Patent Number: 4,494,687
[45] Date of Patent: Jan. 22, 1985

[54] EXPANDED CAR BODY WELDING ASSEMBLY SYSTEM

[75] Inventor: Cristiano Rossi, Birmingham, Mich.

[73] Assignee: Comau S.p.A., Grugliasco, Italy

[21] Appl. No.: 477,125

[22] Filed: Mar. 21, 1983

[51] Int. Cl.³ .......................... B23K 37/04; B23Q 7/14
[52] U.S. Cl. ........................................ 228/47; 104/48;
228/4.1; 219/80; 219/79; 29/563
[58] Field of Search ..................... 228/4.1, 47; 219/79,
219/80; 104/48, 50; 105/148, 150, 153–155;
29/563

[56] References Cited

U.S. PATENT DOCUMENTS

| 3,636,883 | 1/1972 | Wesener | 104/50 |
| 4,256,947 | 3/1981 | DeCandia | 219/79 |
| 4,442,335 | 4/1984 | Rossi | 219/79 |

Primary Examiner—Kenneth J. Ramsey

[57] ABSTRACT

A body assembly system for accurately locating and welding multiple component parts of different vehicle bodies and to interfix their assembled relation at a framing station wherein more than three pairs of interchangeable gates can be employed at a single framing station having programmable welding means adapted to accommodate different body styles associated with the various sets of gates. Means are provided for retrieving, storing and exchanging either pair of end gates of a three pair system while the other end pair is in use at the framing station thereby expanding the versatility of the previous system to accommodate five or more pairs of gates.

22 Claims, 34 Drawing Figures

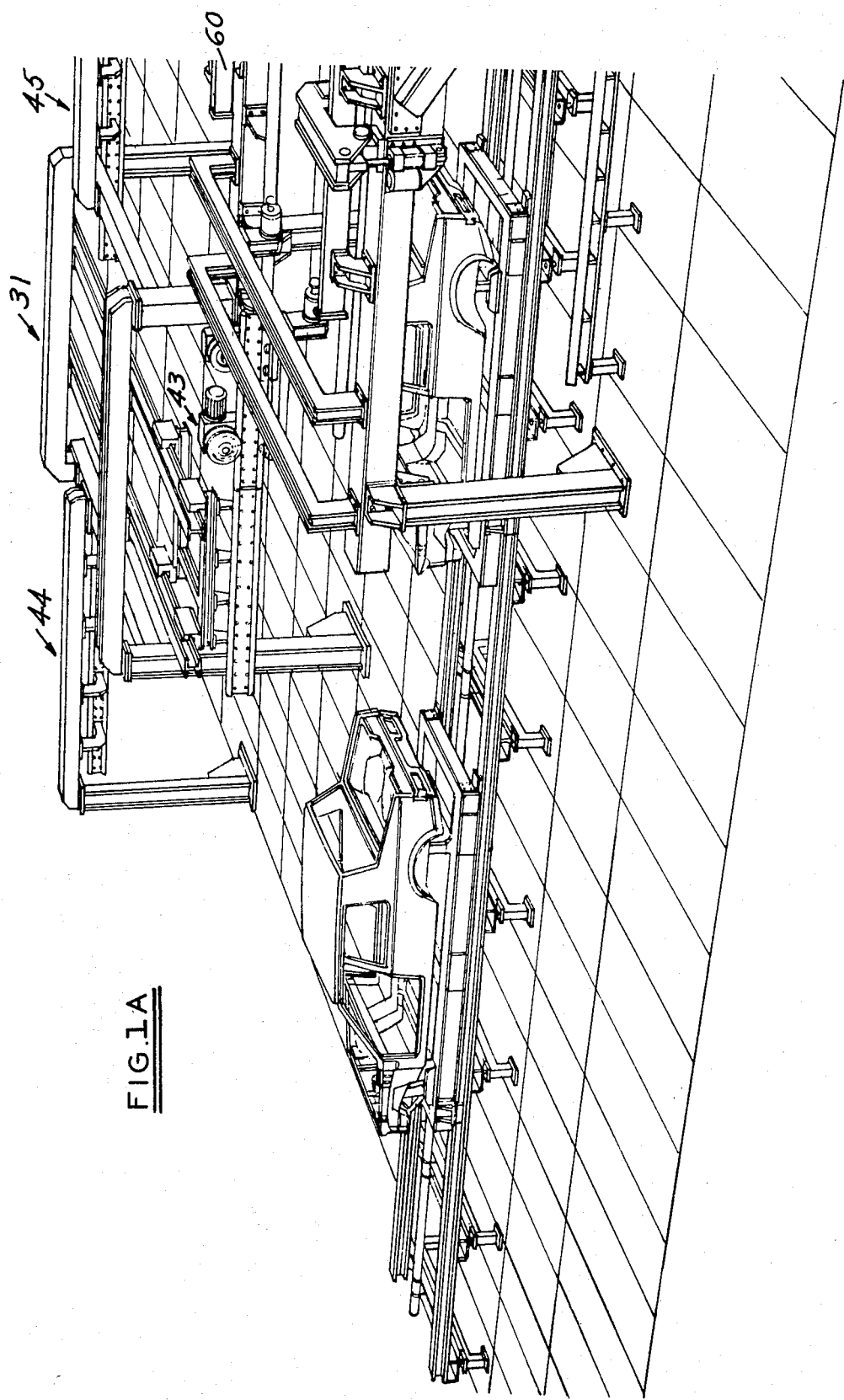

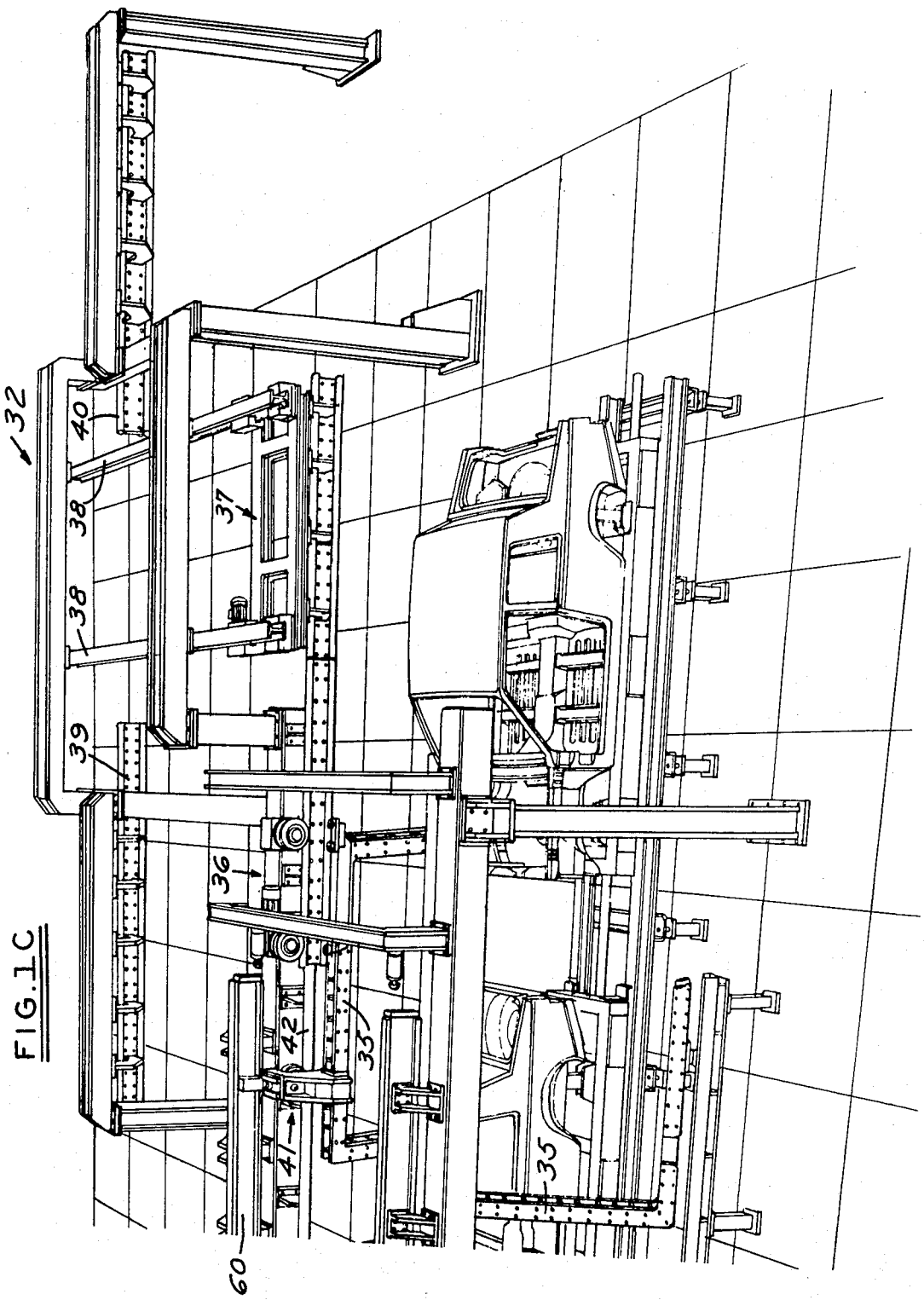

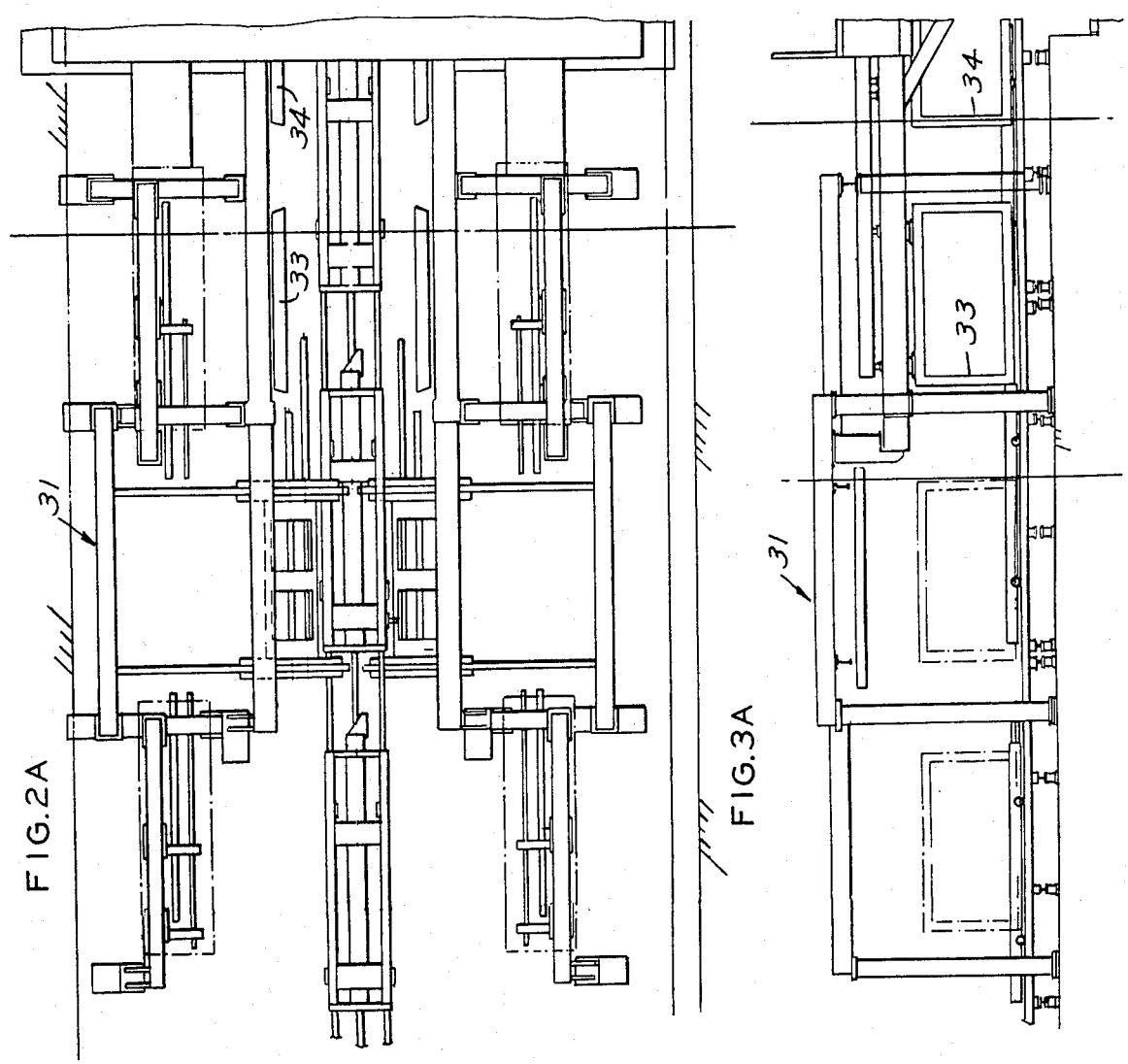

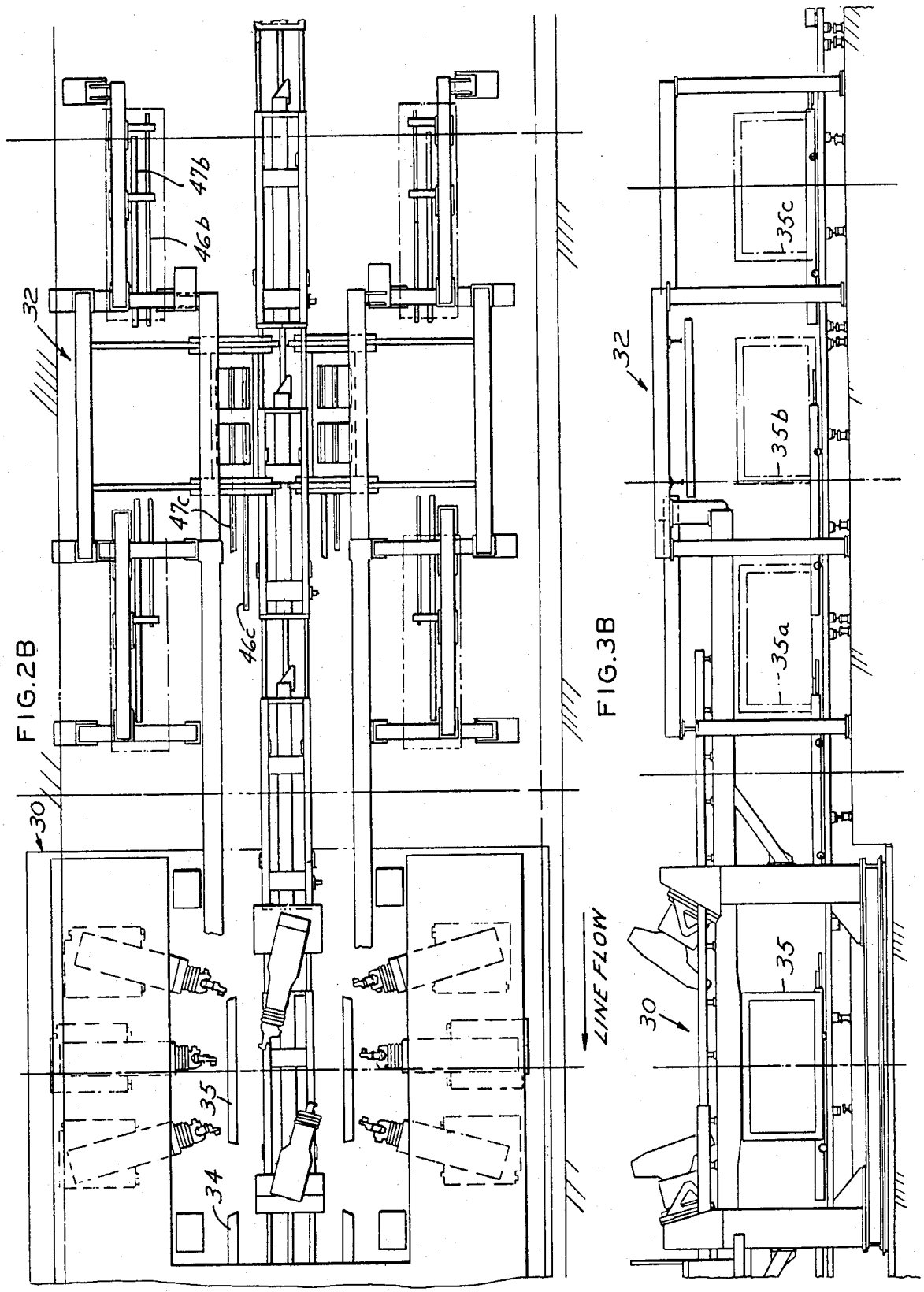

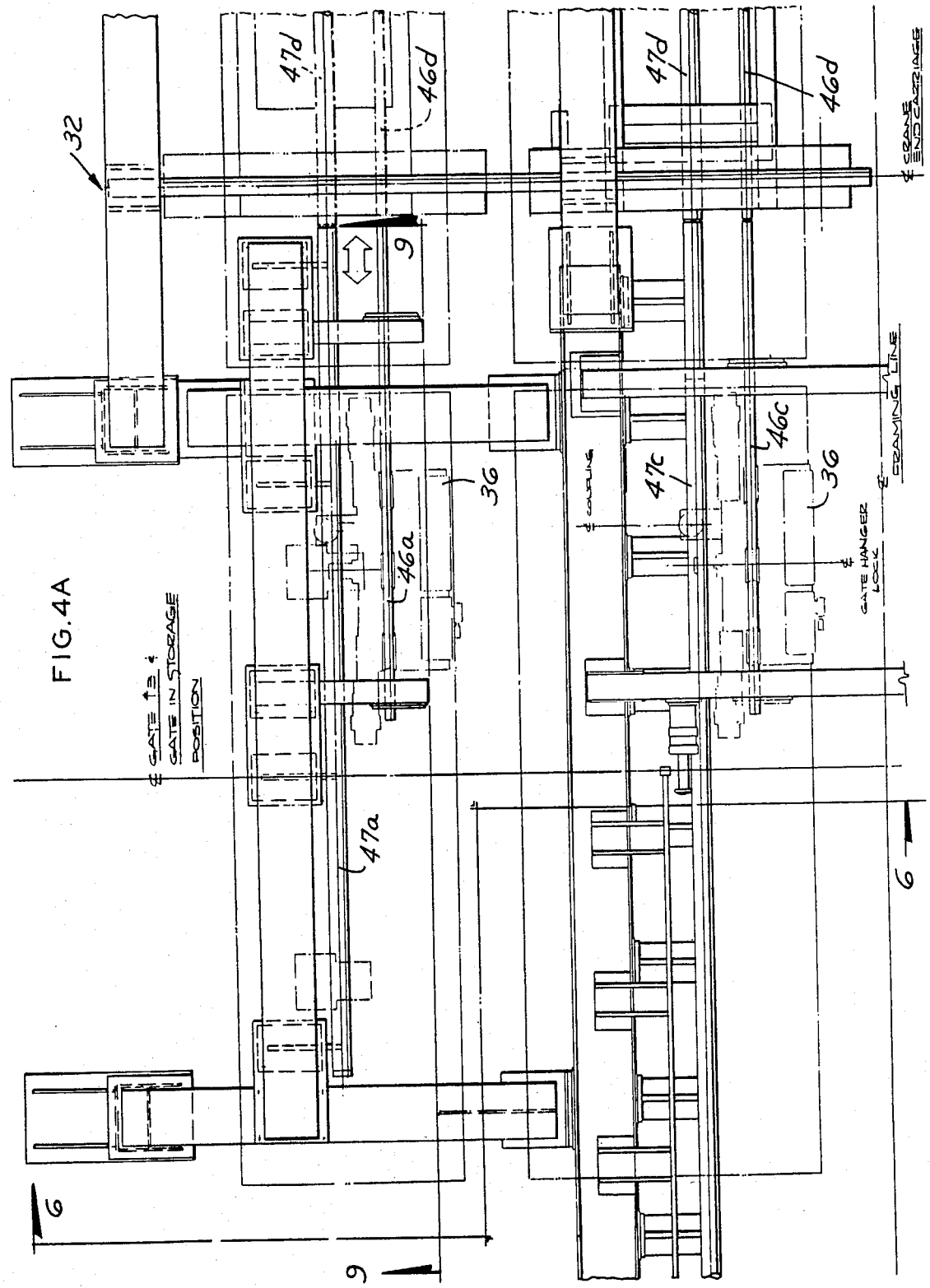

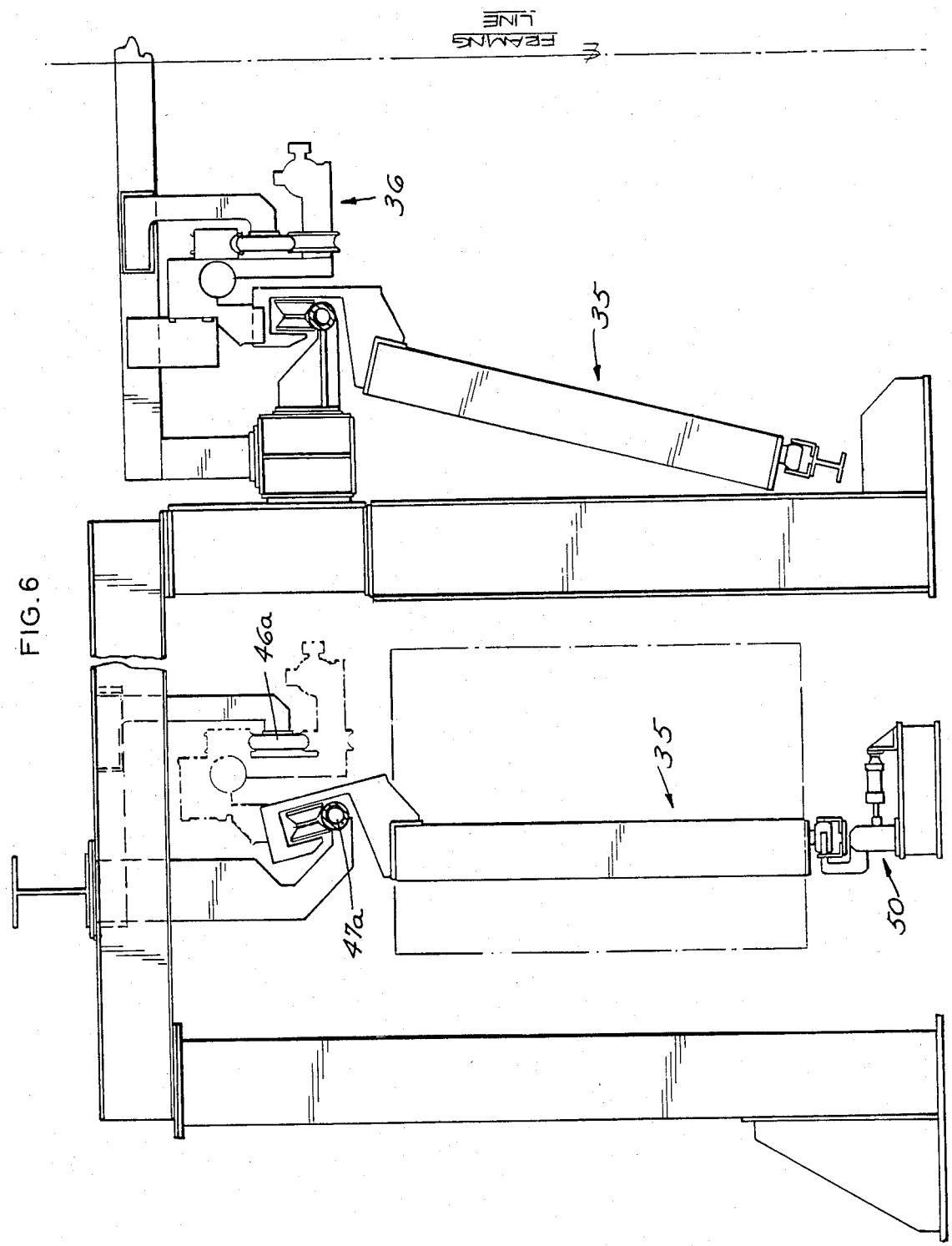

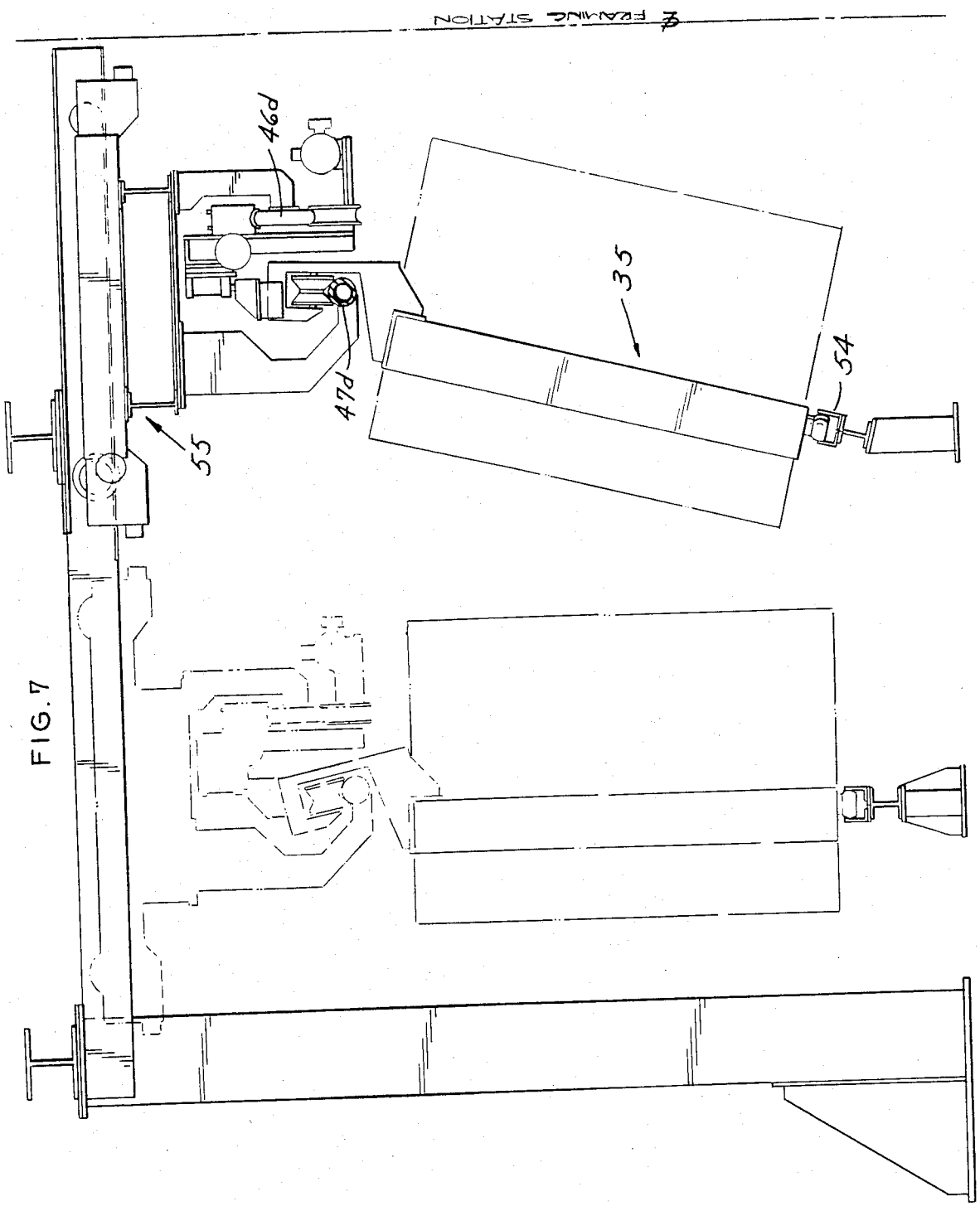

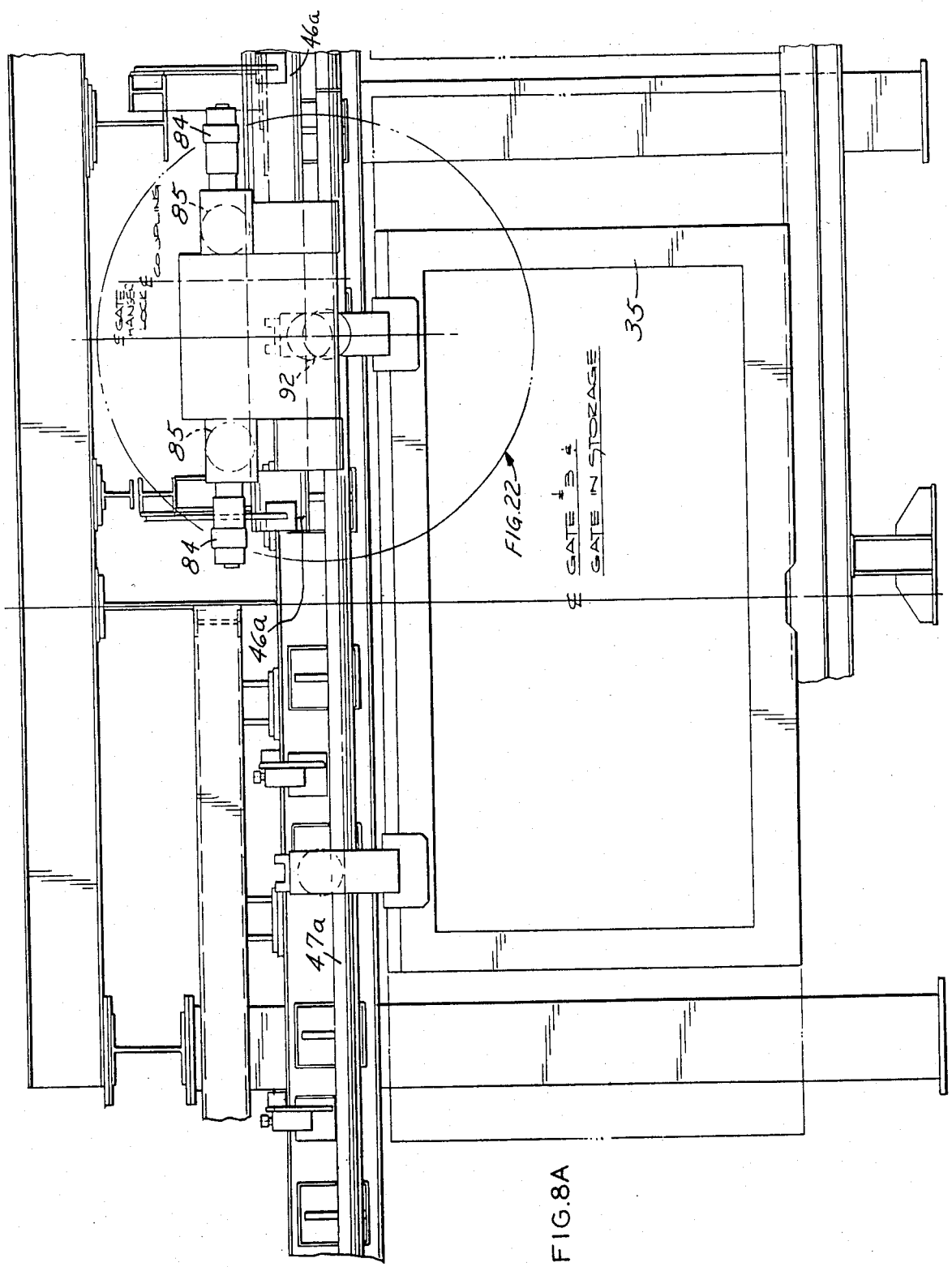

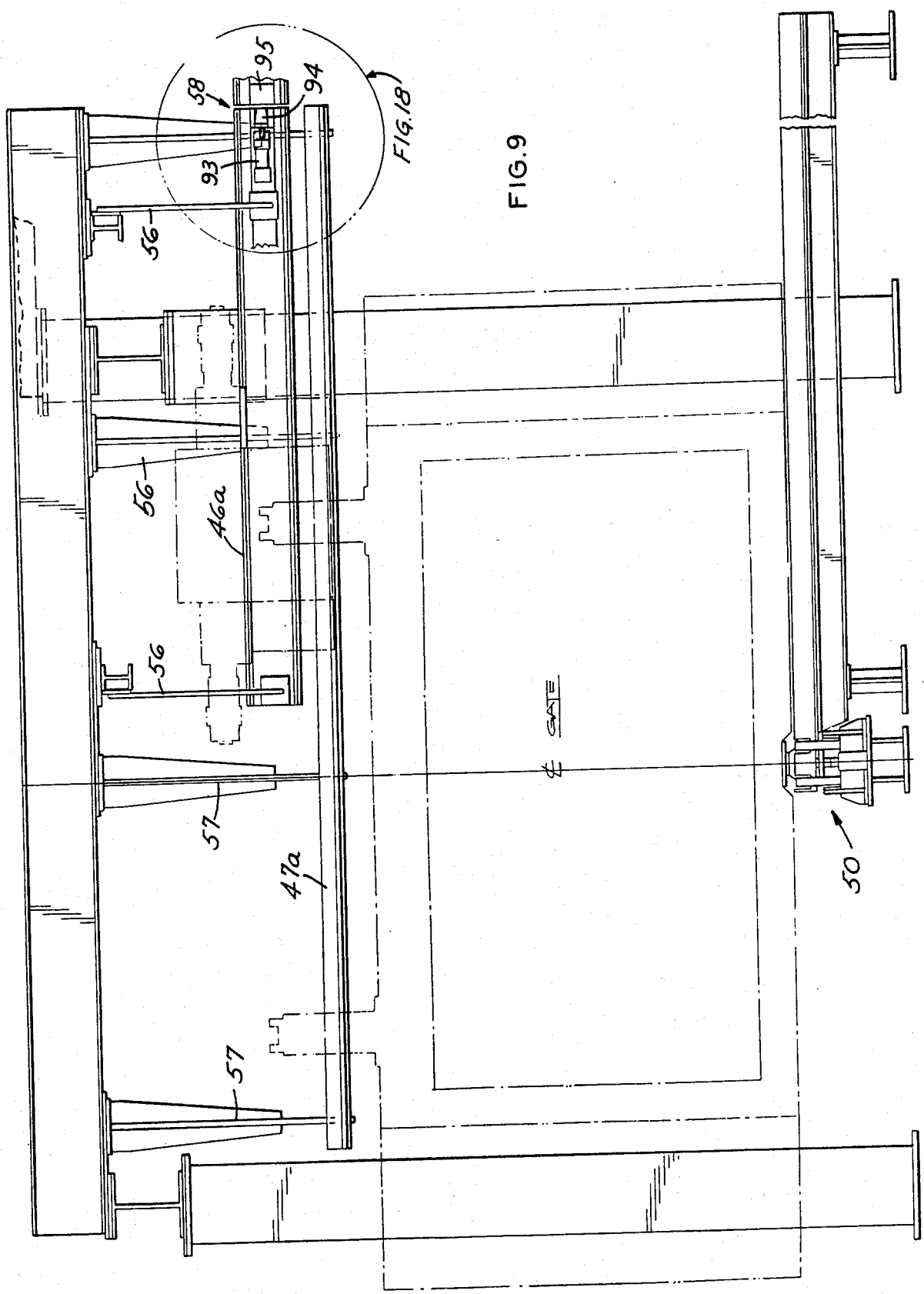

FIG.12
FIG.17
FIG.16
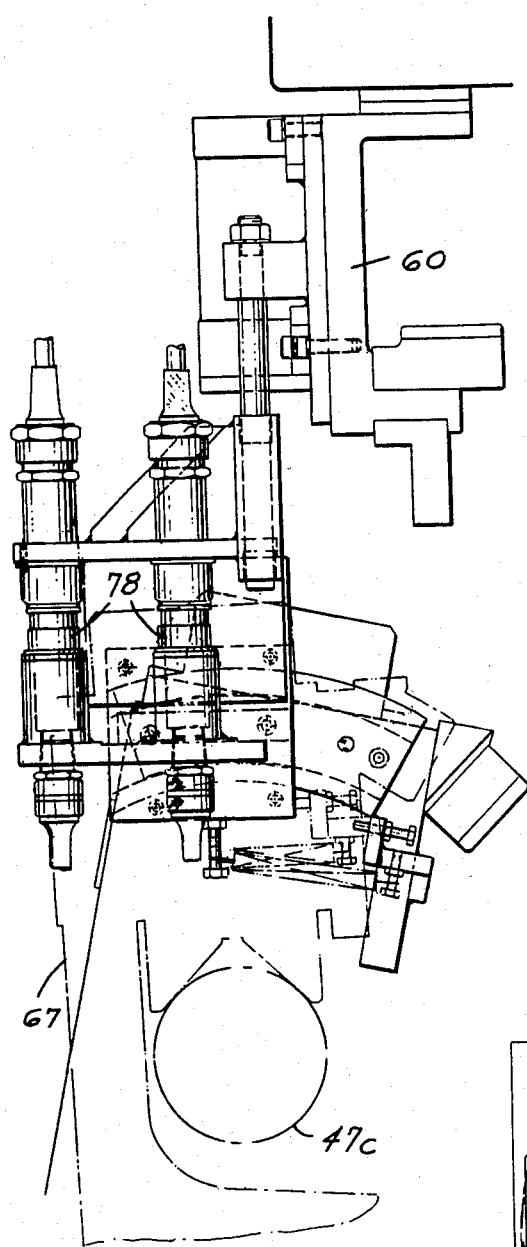
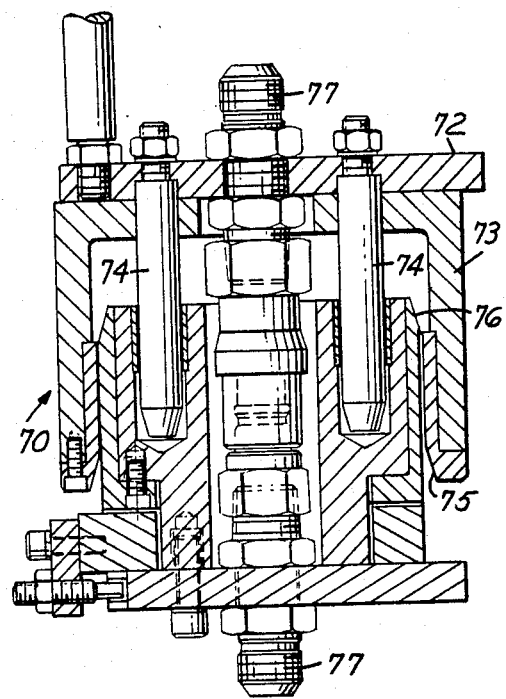
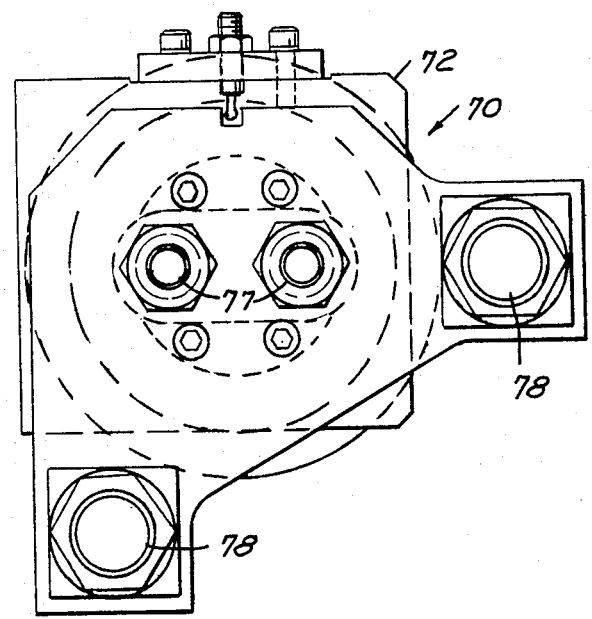

FIG.13
FIG.14
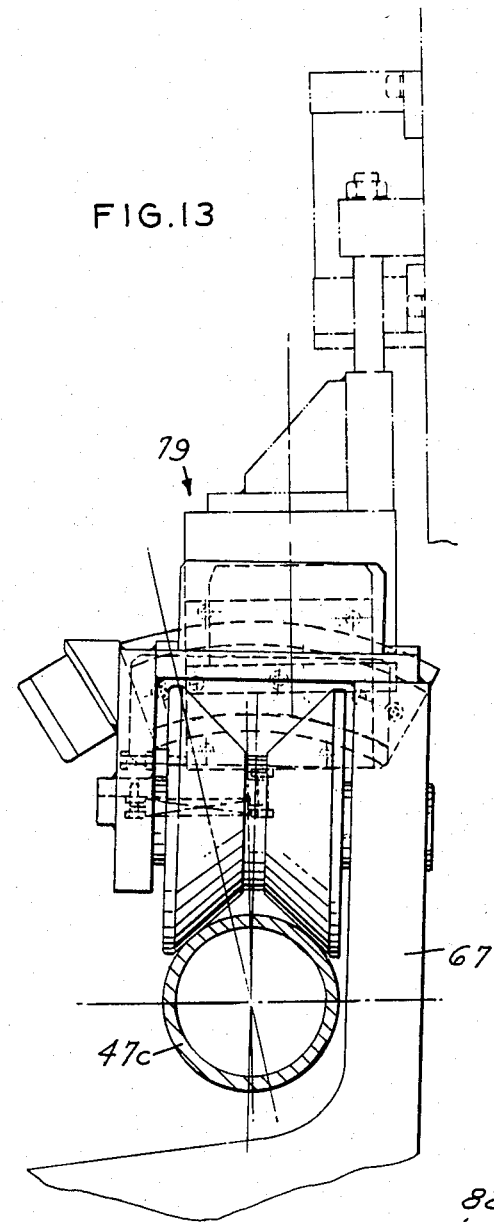
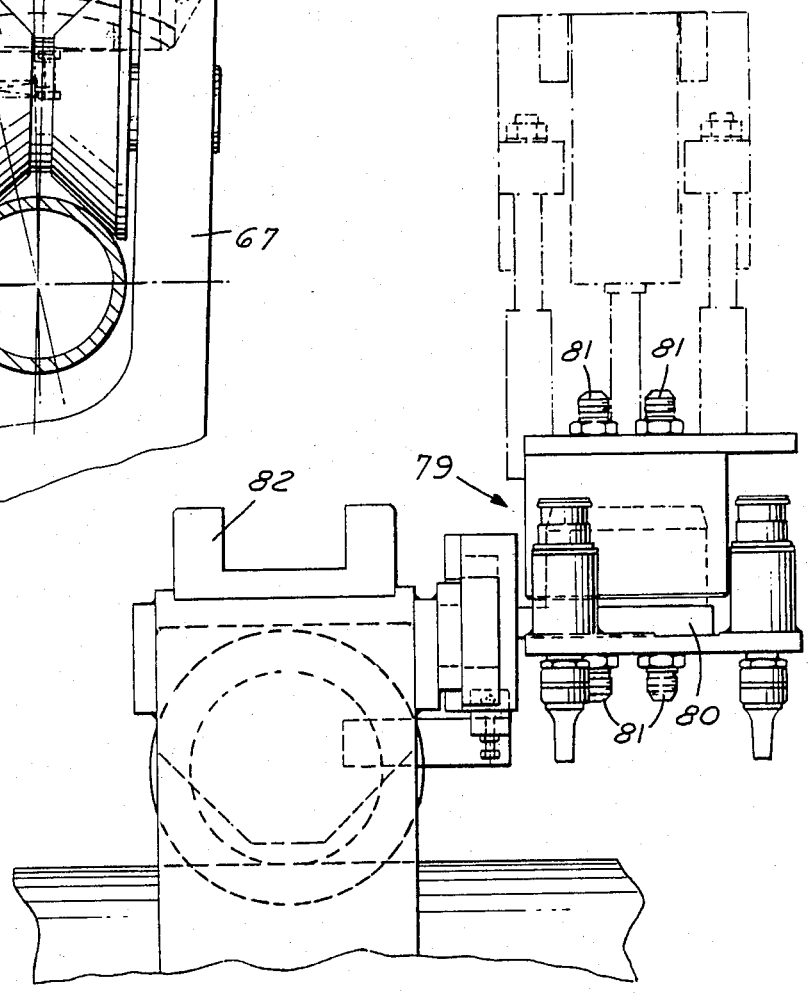

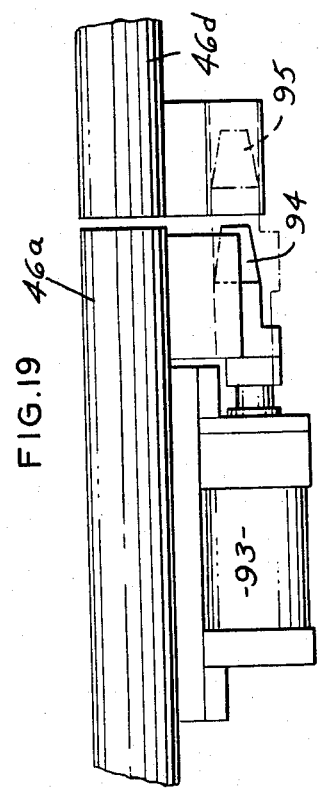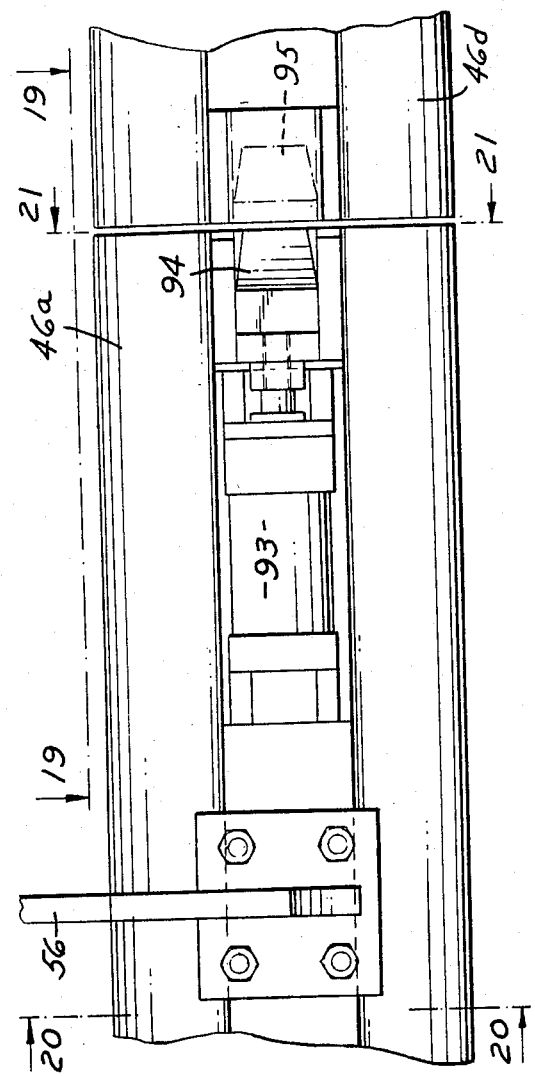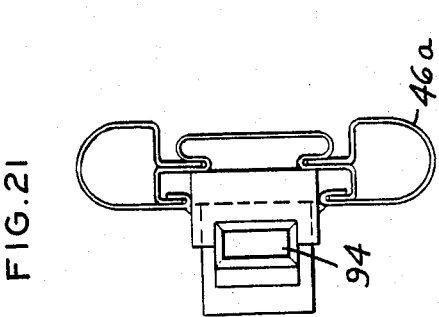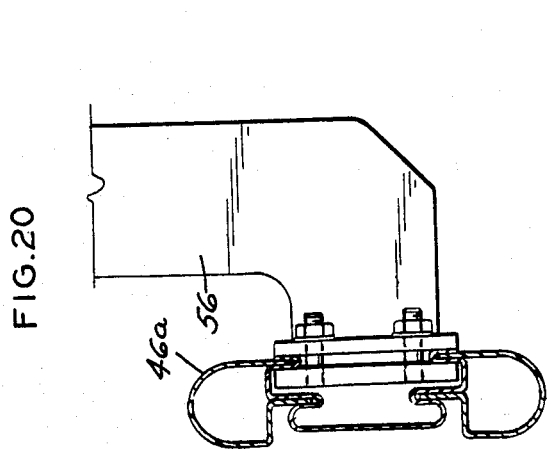

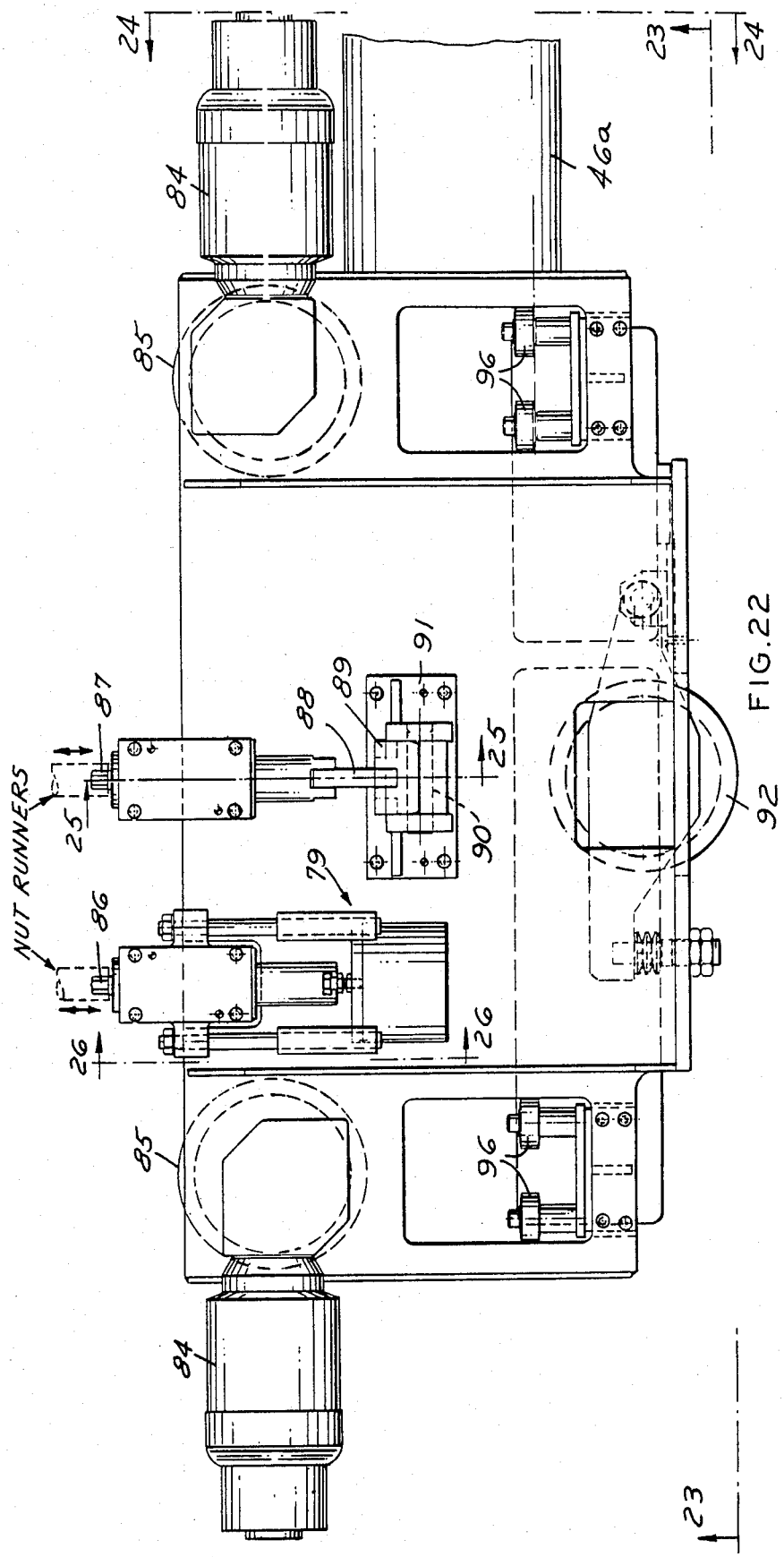

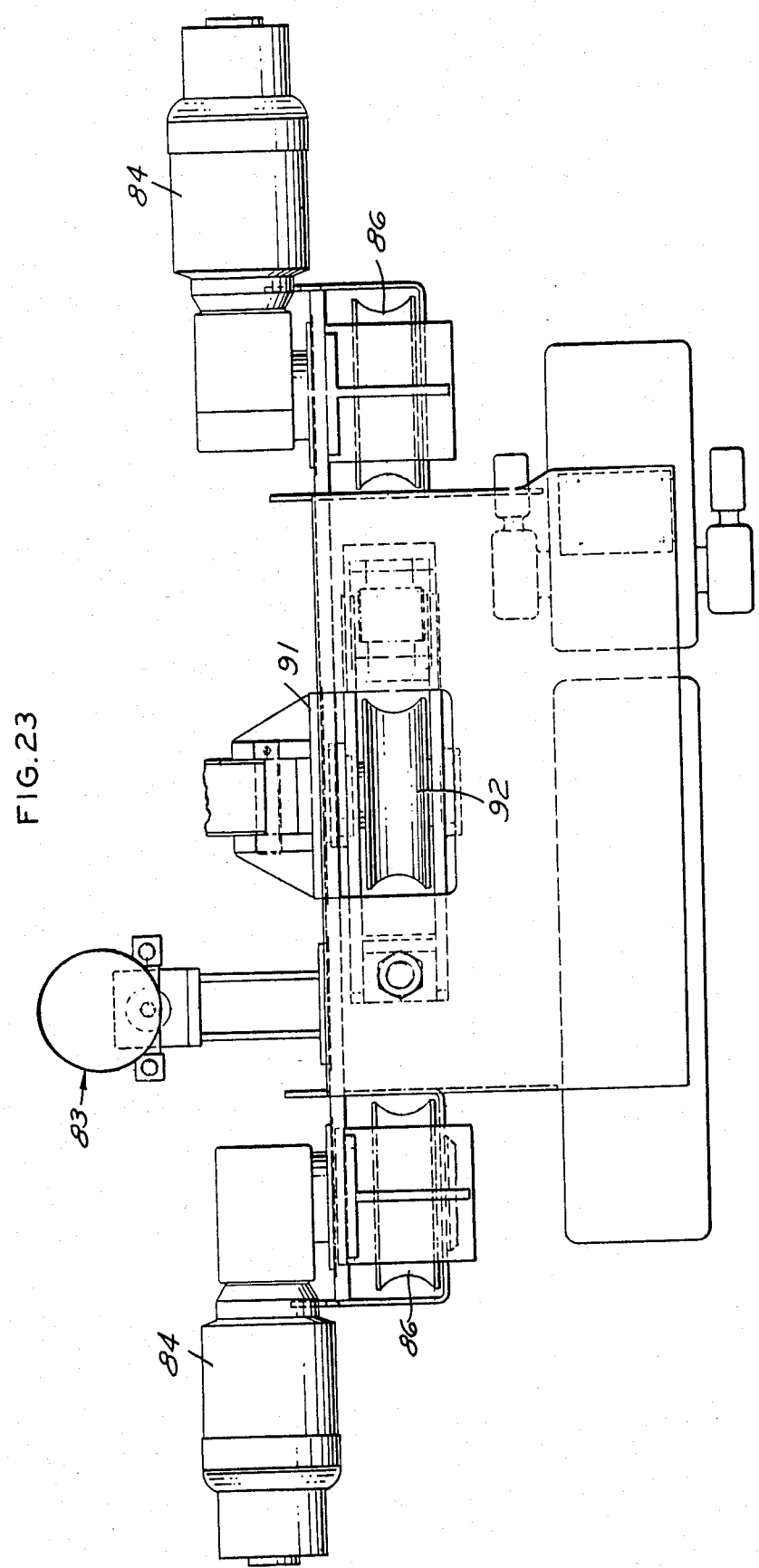

EXPANDED CAR BODY WELDING ASSEMBLY SYSTEM

BACKGROUND OF THE INVENTION

Installations of car body welding assembly systems in accordance with prior U.S. Pat. Nos. 4,162,387 and 4,256,947 have generally employed two or three sets of interchangeable gates in reciprocable relation at a single framing station.

One or more additional framing stations have been employed, on occasion in parallel feeding into a common respot welding line, where a variety of body styles requiring more than three sets of gates has been involved. Duplication of programmable welding robots at each framing station has accordingly multiplied the framing station cost, even where production capacity requirements could be satisfied by a single framing station if it were capable of accommodating the additional different body styles.

BRIEF SUMMARY OF THE INVENTION

The prior three gate system for enabling a single framing station with programmable welders to accommodate three different body styles has been expanded to provide additional gates which may be interchanged for either of the two end gate pairs automatically and without material impairment of the prior time cycle required for gate transfer to the framing station.

A five gate system includes a storage area at either end of the framing station for accommodating alternative pairs of end gates while not in use as part of the reciprocable three gate system. A special monotractor has been developed to implement each automatic end gate substitution which, together with automatic lateral transfer crane effects removal of one end gate to a storage position and substitution of an alternative gate to the end gate position. Such substitution for either end gate pair may be accomplished while the other end gate pair is in use at the framing station so that proper scheduling of different production models can substantially avoid delays incident to gate transfer beyond those of the prior three reciprocating gate system.

In order that each gate may be continuously supplied with air power to maintain the tooling in retracted position during transport to and from storage areas, an electrically powered air compressor is provided on each monotractor with automatic means for coupling same to the gate at the time of gate drive engagement both at storage area and framing line positions.

Transport to and from storage areas is accomplished by monotractor drive to a central crane track position, lateral crane drive to a storage track position extending on either side of the crane track and monotractor drive of the gate to and from either storage track position.

The five gate system disclosed in the present specification may be further expanded by addition of supplemental parallel storage tracks to be serviced by the same monotractor and crane system as disclosed herein.

BRIEF DESCRIPTION OF THE DRAWINGS

FIGS. 1A, 1B and 1C are left, center and right portions of a composite perspective view of a five gate framing line version of the present invention;

FIGS. 2A and 2B are left and right hand portions of a composite plan view of the five gate framing station illustrated in FIGS. 1A, 1B and 1C;

FIGS. 3A and B are left and right hand portions of a side elevation of the five gate framing station illustrated in FIGS. 2A AND 2B;

FIGS. 4A and 4B are left and right hand portions of a composite enlarged plan view of one of the gate storage areas illustrated in the upper right hand corner of FIG. 2B;

FIG. 6 is a view taken along the line 6—6 of FIG. 4A;

FIG. 7 is a view taken along the line 7—7 of FIG. 4B;

FIGS. 8A, 8B, and 8C are enlarged left, center and right portions of a composite side elevation of the storage area shown in FIGS. 4A and 4B;

FIG. 9 is a view similar to FIG. 8A taken along the line 9—9 of FIG. 4A;

FIG. 12 is an enlarged fragmentary sectional view taken along the line 12—12 of FIG. 10;

FIG. 13 is an enlarged fragmentary sectional view taken along the line 13—13 of FIG. 10;

FIG. 14 is an enlarged view of the area FIG. 14 encircled in FIG. 10;

FIG. 16 is an enlarged fragmentary sectional view taken along the line 16—16 of FIG. 15;

FIG. 17 is an enlarged fragmentary view taken along the line 17—17 of FIG. 15;

FIG. 18 is an enlarged fragmentary view of the area FIG. 18 encircled shown in FIG. 9;

FIG. 19 is a plan view taken along the line 19—19 of FIG. 18;

FIG. 20 is a sectional view taken along the line 20—20 of FIG. 19;

FIG. 21 is an end view taken along the line 21—21 of FIG. 19;

FIG. 22 is an enlarged side elevation of the monotractor per se illustrated in the encircled area FIG. 22 of FIG. 8A taken from the opposite side;

FIG. 23 is an underside view of the monotractor taken along line 23—23 of FIG. 22;

With reference to FIGS. 1A, 1B and 1C, central main framing station 30 is illustrated with gate storage units 31 and 32 on either side, the viewers half of the side gate storage units being omitted for clarity. Left hand gate pair 33 is shown in framing station position with central gate pair 34 and right hand gate pair 35 shown in aligned standby position. Monotractor 36 is shown on a track section in position to engage gate 35, by means later described in detail, for transfer to a separable rail section in alignment with crane 37 for crane transfer on rails 38 to a position of crane track alignment with left storage track 39 and right storage track 40 whereupon monotractor 36 can move gate 35 to either left or right storage position depending on which is empty and then engage an alternative gate, not shown, stored on the other storage rail for movement to the central crane rail for crane transfer to the position shown and monotractor movement to the position of the right hand gate 35 for subsequent linear transfer to the framing aligned station position of gate 33.

Figure 1B:
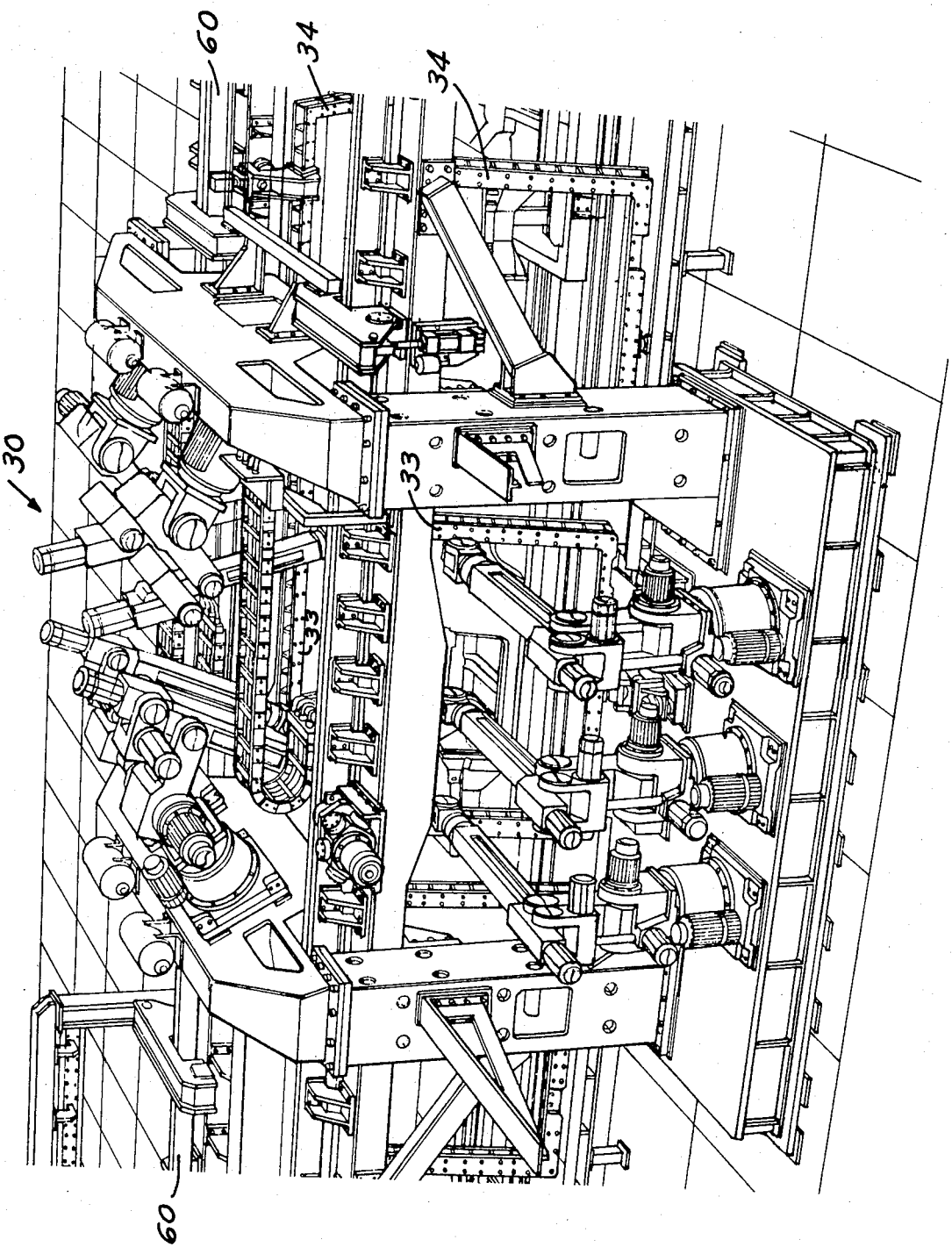

As more clearly shown in other views, gate hanger trolleys 41, two of which are employed for each gate (one of which is omitted in the view of FIG. 1C for gate 35) travel on a separate rail 42 from the monotractor track 36 which enables the monotractors to release a given gate on a storage track 39 or 40 and move to engaging position for a gate on the other track.

With gate 35 advanced to the position of gate 33, the latter gate would be in the position corresponding to gate 35, as shown, but at the left hand storage area 31 where monotractor 43 would be in a position to engage and transfer the gate to one of storage tracks 44 or 45 in a manner similar to that described for the right hand storage area 32.

It will be understood that the system illustrated in FIGS. 1A, 1B and 1C is duplicated for the viewer's side gate storage areas not shown; also that in operation, substitution of a different end gate from one of the storage areas may take place while the opposite end gate pair is located at the framing station for use in framing one or more bodies of the style accommodated by such end gate, so that properly scheduled there need be no delay in production for required substitution of end gates; and so that bodies of different styles requiring five gates may be welded at the central framing station on a time cycle substantially the same as in a three gate system such as where gates 33, 34 and 35 are the only ones employed.

While storage areas 31 and 32 have been shown with provision for storing either of two alternative gates, successive parallel storage tracks could be provided and serivced by the same monotractor 36 and crane 37 to even further expand the system beyond the five gate capacity without impairing cycle time and production capacity.

The central gate 34 will normally remain unchanged in the system and will normally be tooled for the body style having highest volume production requirements. The three aligned gates 33, 34 and 35 are normally moved together by a shuttle bar 60 transport mechanism for positioning any of the three at framing station 30 in accordance with prior practice.

Pneumatic actuating and electrical control power must be supplied to each end gate during shuttle bar transport and air power must be maintained during transport to and from storage which is accomplished by a transition coupling system forming a part of the present invention. Each monotractor is specially equipped with electrically powered air compressor and mechanical means for effecting drive coupling with the gate as well as for establishing air power supply connection with the gate as hereafter described in detail.

It will be understood that the shuttle portion of the system including the framing station and six robot welders illustrated at such station operate in accordance with the prior disclosure of U.S. Pat. No. 4,162,387 and accordingly will not be described herein in detail, the present invention being directed primarily to convert a three gate system to a five or more gate system for increasing the flexibility to handle different body styles at a single framing station without penalty of increased cycle time and with cost savings for duplicate framing stations otherwise involved to handle requirements for more than three major body styles.

With reference to FIGS. 2A, 2B, 3A and 3B, plan and side elevation schematic views illustrate the system shown in perspective views of FIGS. 1A, 1B and 1C. Gates 33, 34 and 35 are in this case shown shifted to a left hand position with phantom gates 35a, 35b and 35c illustrating respectively storage, crane transfer and storage longitudinal locations for the right hand gate 35. Relative positions of both gate pairs for each storage area 31 and 32 are illustrated in FIGS. 2A and 2B.

Figure 4B:
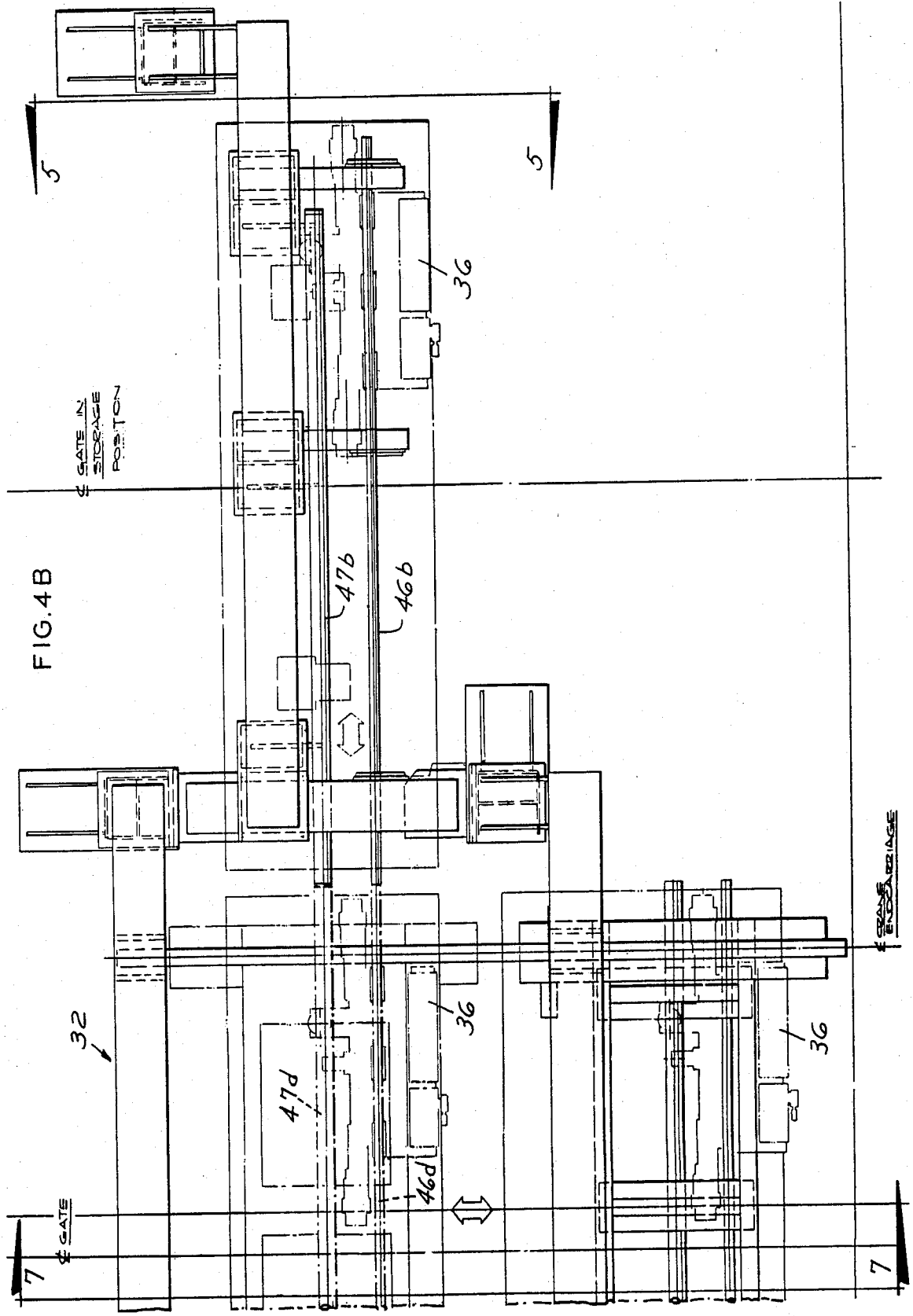

With reference to FIG. 2B and corresponding enlarged view of FIGS. 4A and 4B, parallel monotractor and gate tracks as shown in the upper right hand portion of storage area 32 together with corresponding monotractor and gate tracks for movement to and from the storage crane can be seen with clarity. In such figures the corresponding alignable monotractor and gate track sections 46a and 47a; 46b and 47b; 46c and 47c; and 46d and 47d are shown respectively for left and right sections of storage area 32, framing line, and crane, the latter being shown in both transfer position in FIGS. 4A and 4B wherein the respective positions of monotractor 36 at the five extremities of its travel are shown in phantom.

Figure 5:
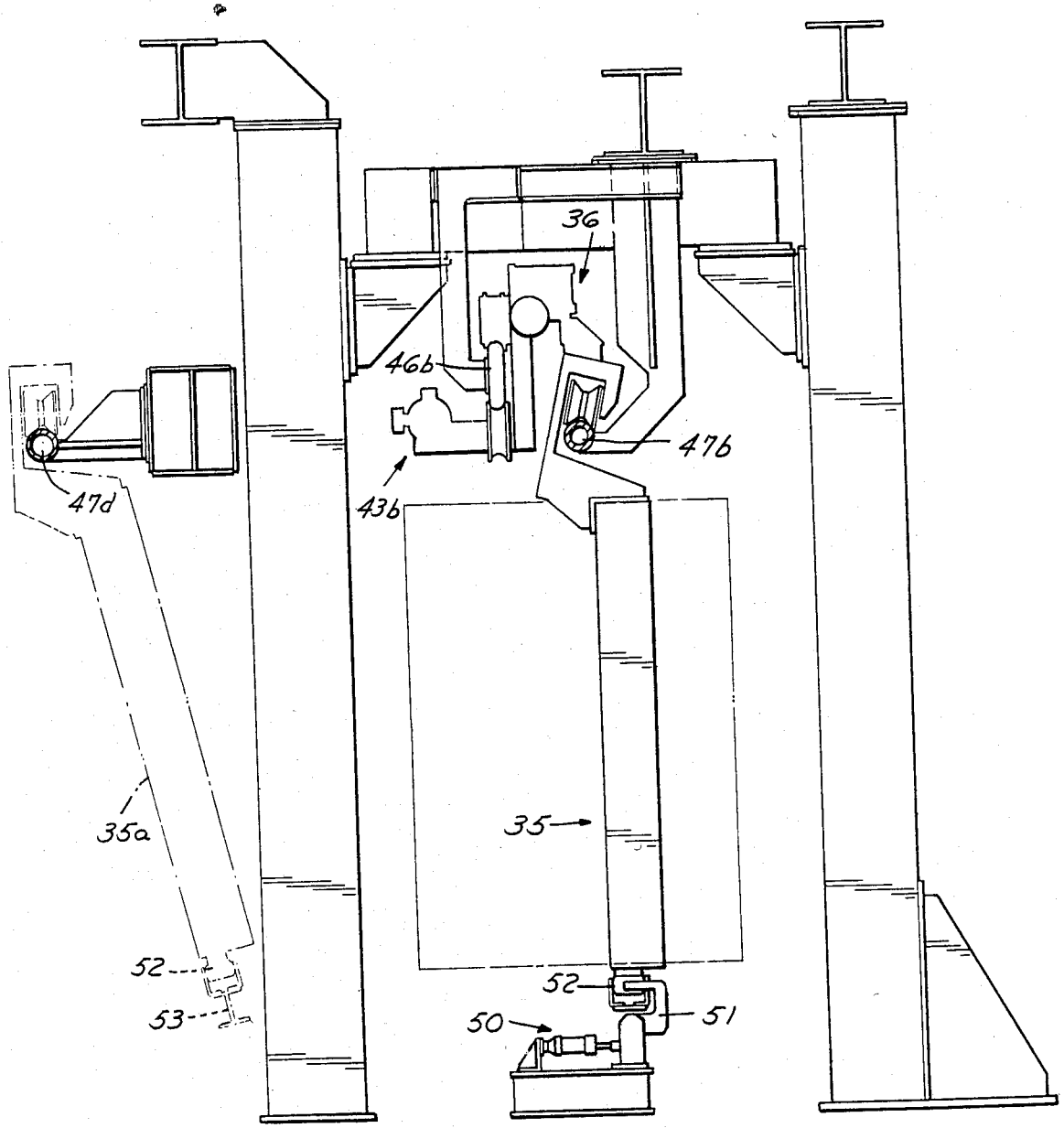
FIG. 5 is a view taken along the line 5—5 of FIG. 4B.

With reference to the sectional views of FIGS. 5, 6 and 7 the relation of monotractor 36 and gate 35 in the storage area is shown. In FIG. 5 the full line vertical position of gate 35 corresponds to final storage position where cylinder 50 actuates fork 51 to trap gate guide roller 52 to fix and maintain its longitudinal position. During crane movement the gate is free to swing laterally and may assume a lateral position such as shown at 35a when track alignment with the storage area is reached. During longitudinal movement into the storage position, guide track 53 engages roller 52 along an angular path which leads to the vertical storage position.

With reference to FIG. 6 the right hand portion of the view illustrates the position of gate 35 when it is ready for drive engagement by monotractor 36 to move it to the crane transfer position, the left hand portion of the drawing showing a storage position similar to that of FIG. 5.

With reference to FIG. 7 the position of gate 35 preparatory to movement onto monotractor crane track section 46d and gate track section 47d is shown.

Figure 8B:
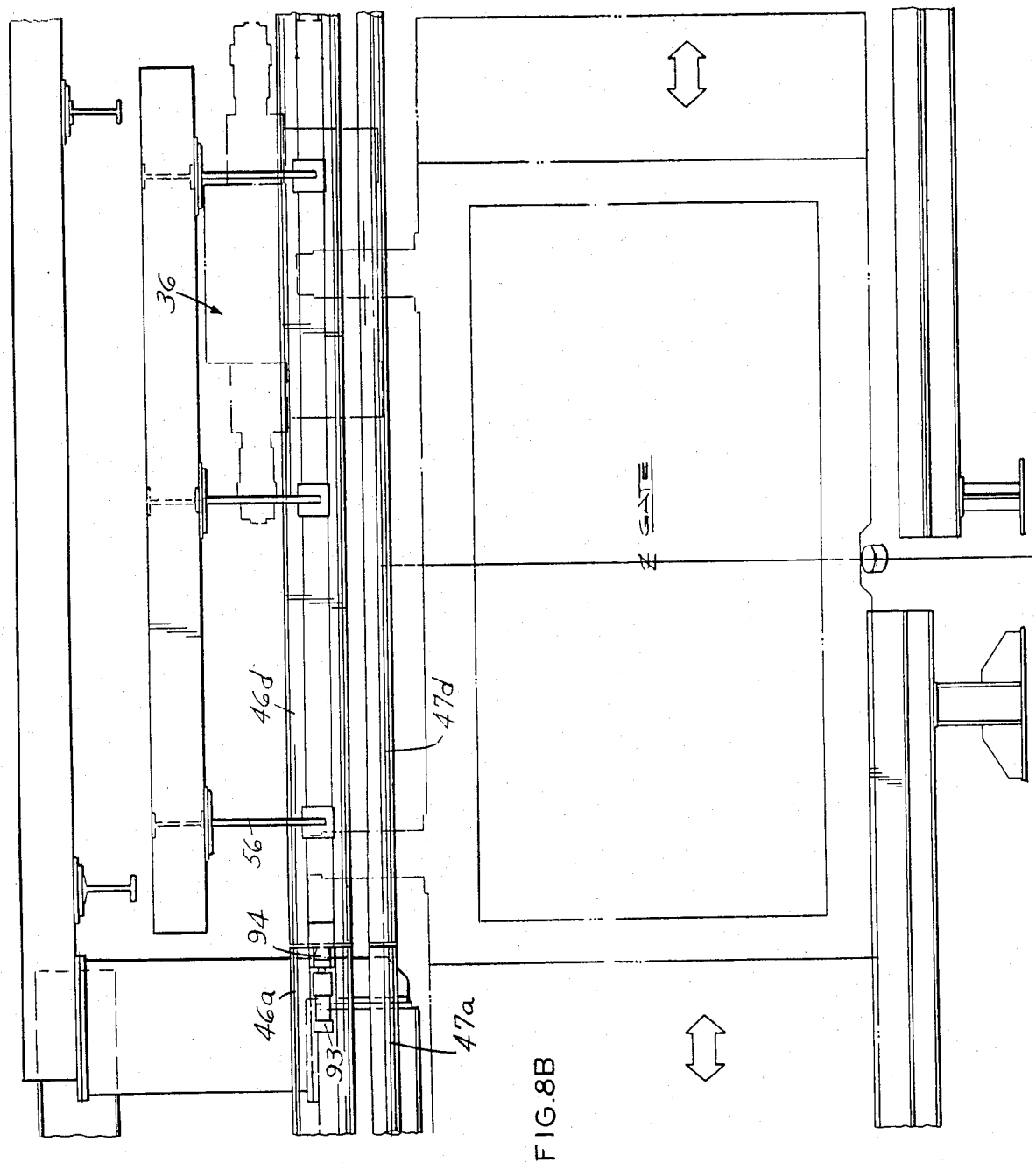
Figure 8C:
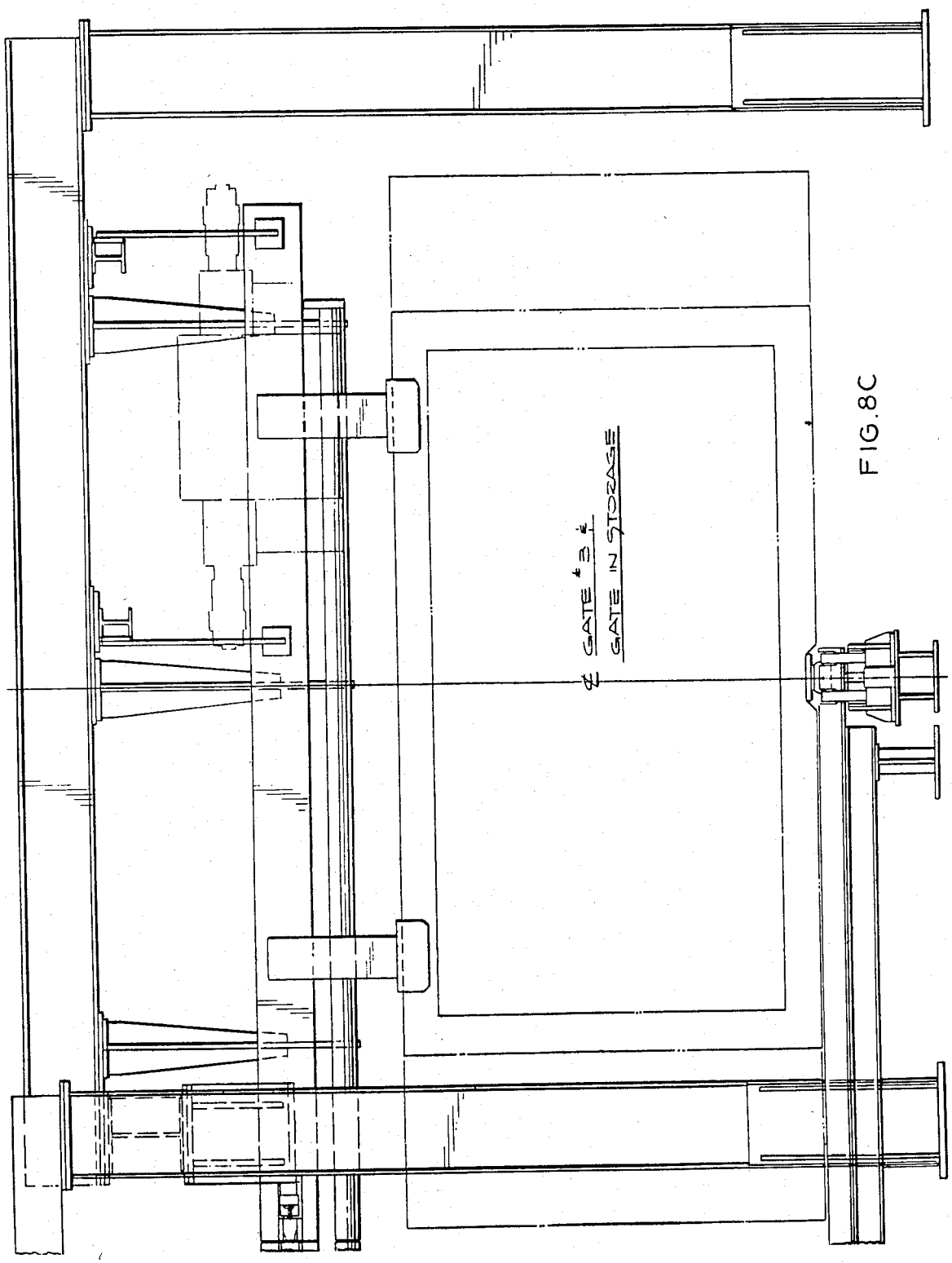

With reference to FIGS. 8A, 8B and 8C the relative crane transfer and storage positions of the gates are shown; also the position of monotractor 36 in the central crane transfer position as well as positions for engaging and disengaging gate drive with the gate in storage. Track alignment guides later described in detail serve to assure alignment of the gate and monotractor tracks for transfer between the crane and storage tracks.

With reference to FIG. 9 the relation of monotractor track 46a and gate track 47a per se, with method of suspension by hangers 56 for the monotractor track and 57 for the gate track, are shown together with cylinder means 58 for aligning the respective crane and storage monotractor tracks as shown in the enlarged view of FIG. 18.

Figure 10:
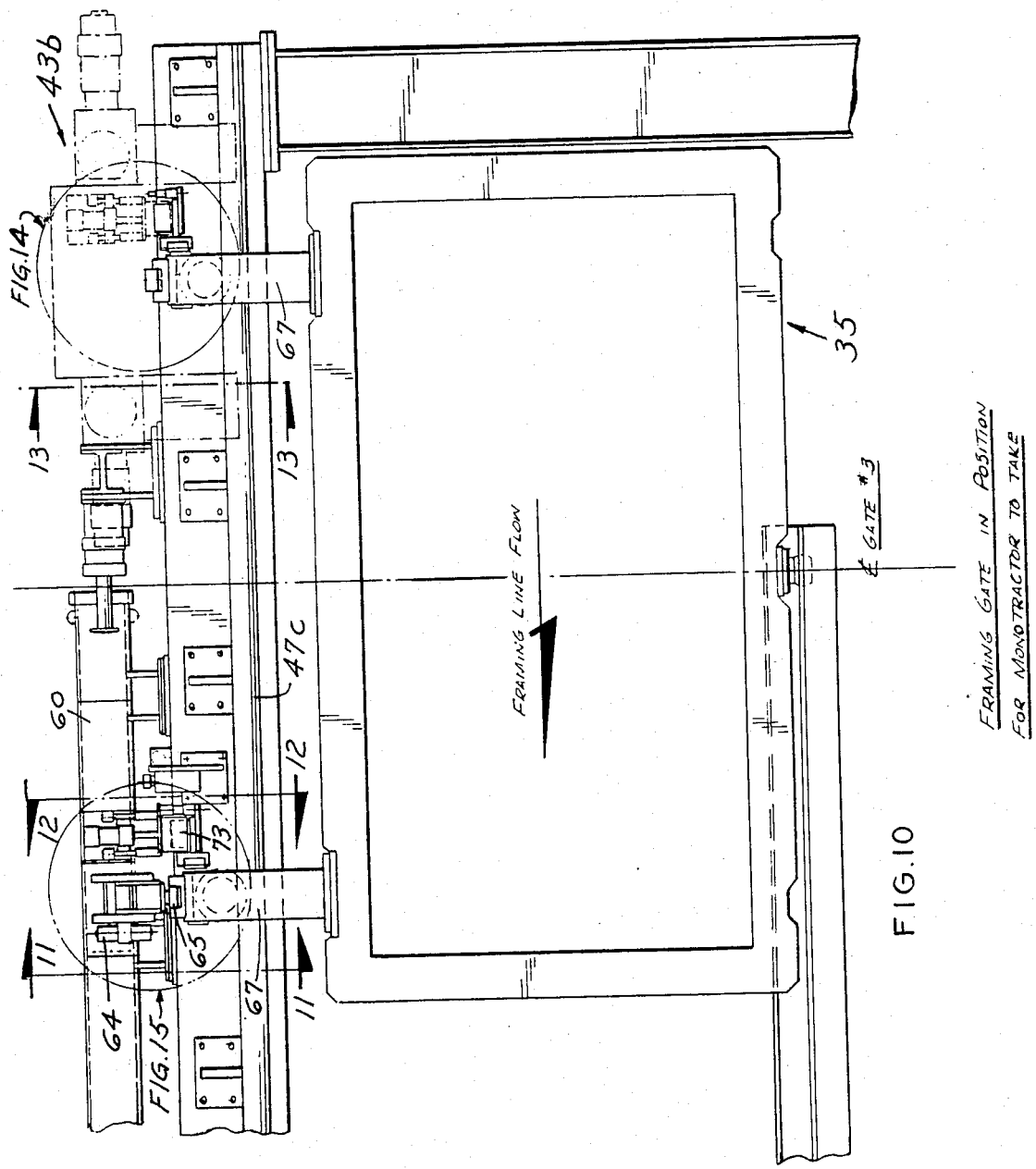
FIG. 10 is a view similar to FIG. 8C showing a right hand gate in shuttle bar aligned position for monotractor drive engagement.
Figure 11:
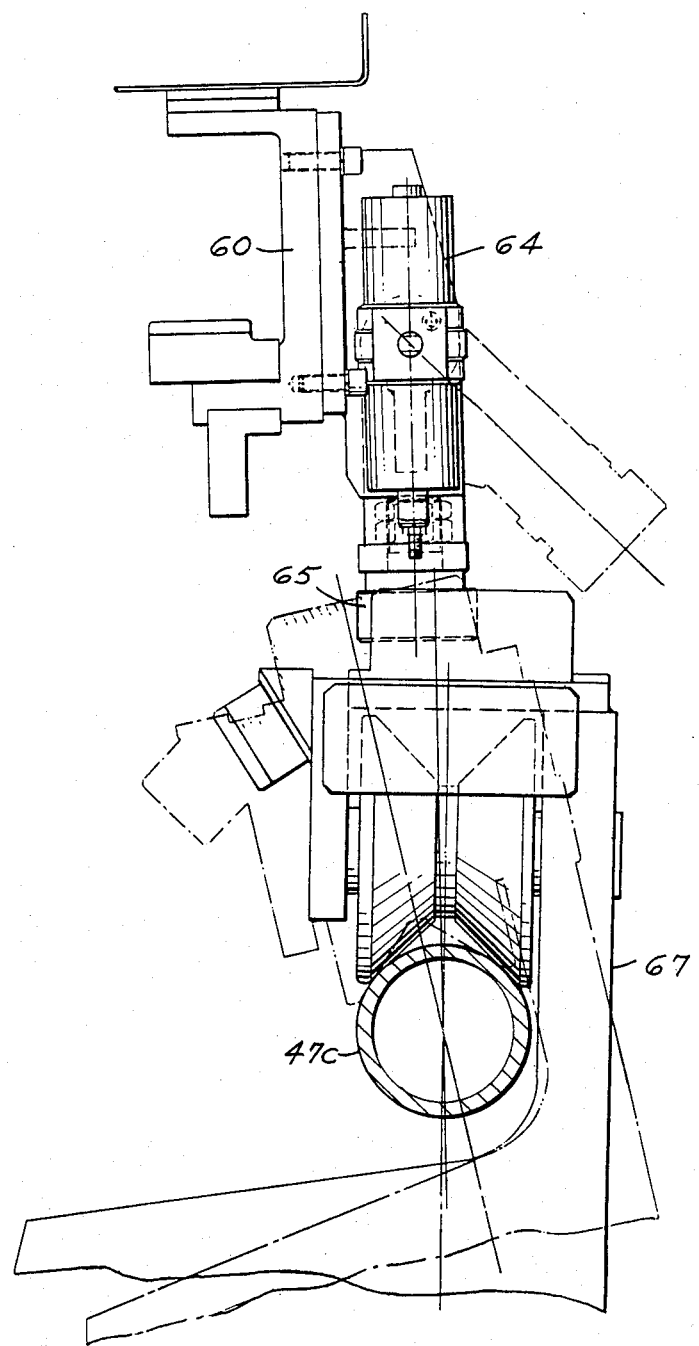
FIG. 11 is an enlarged fragmentary sectional view taken along the line 11—11 of FIG. 10.
Figure 15:
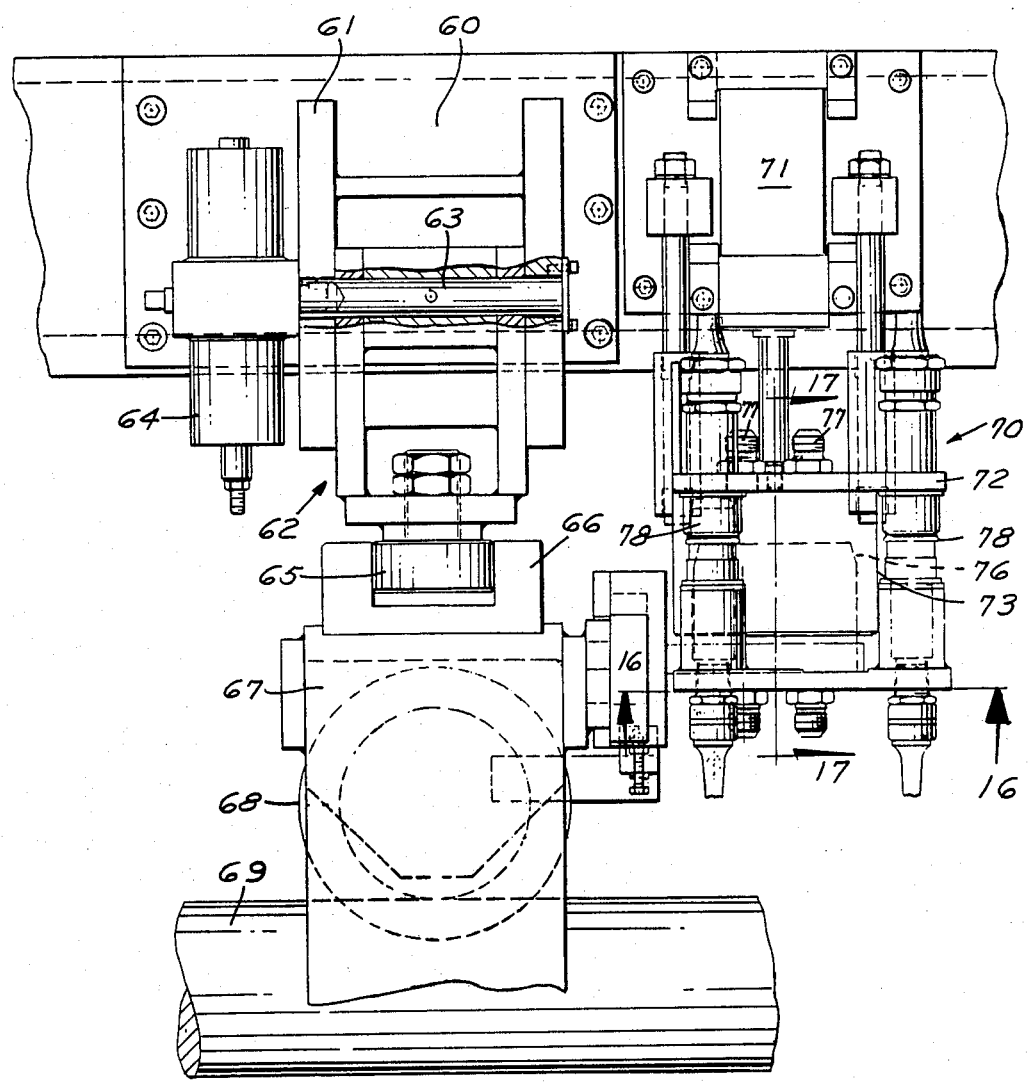
FIG. 15 is an enlarged view of the area FIG. 15 encircled in FIG. 10.

With reference to FIG. 10 a right end gate 35 in the position shown in FIG. 1C is illustrated with the general arrangement of monotractor connections indicated in the encircled area FIG. 14 and shuttle bar connections indicated in the encircled area FIG. 15. Such figures and sectional views of FIGS. 11, 12 and 13 illustrate drive, air power and electrical connections.

Considering FIGS. 15, 16 and 17 illustrating in detail the drive and power connections between the shuttle and end gate 35, shuttle bar 60 mounts bracket 61 on which drive pin assembly 62 is pivotally mounted through shaft 63 rotated by cylinder 64 to engage and disengage drive pin 65 from drive yoke 66 fixed to the top of hanger 67 on which hanger wheel 68 is mounted to engage fixed gate rail 69 which extends through the framing station.

Connector assembly 70 also mounted on shuttle bar 60 is actuated by a cylinder 71 to raise and lower plate 72 which carries female socket 73 having guide pins 74 which together with tapered surfaces 75, 76 establish alignment of air connections 77 and electrical connections 78 for powering and controlling the tooling on the gate employed in locating body components at the framing station. In order to assure that such tooling remains in open position during transfer of the gates to storage as well as during reciprocation to and from the framing station it is necessary that air power be supplied continuously to each gate. Accordingly, each monotractor is equipped with an electrically powered air compressor and adapted to establish air power supply to the gate before the air supply of coupling 70 is removed and to maintain same during transport to and from the storage area. With reference to FIGS. 13 and 14, air to the gate is supplied through coupling assembly 79 similar to assembly 70 which is mounted on the monotractor to engage female receptacle 80 with air connections 81. Actuation of coupling assembly 79 to establish such connection when the gate and monotractor are in proper relative orientations as shown in FIG. 10 and to establish a drive connection with the gate through yoke 82 is accomplished by means best understood with reference to drawings illustrating the monotractor per se in FIGS. 22, 24, 25 and 26.

The monotractor is supplied with electrical power through three bus bars, not shown, two of which supply power for air compressor 83 and a pair of drive motors 84 for driving a pair of upper wheels 85 engaging monotractor track 46c and the other of which is employed for electrical signals. In accordance with the requirement for the monotractor to establish and maintain drive and air power connections upon engaging a gate to move it from the framing line into storage, and likewise upon engaging the gate in storage to move it into end position on the framing line, each monotractor is provided with a pair of externally driven cap screws 86, 87 automatically engaged by nut runners at the respective monotractor locations where drive and power engagement and disengagement is required. Connector 79 actuated by a cap screw 86 establishes air power supply to the gate and drive connection is established with yoke 82 by actuating cap screw 87, link 88, and drive dog 89 pivotally connected at 90 to bracket 91. It will be understood that through such external actuation of nut runners, controls for engaging, driving and retracting the nut runners may be external to the monotractors and actuated in response to arrival of the monotractors at the required locations for drive engagement and disengagement.

Each monotractor is provided with a spring loaded idler wheel 92 in addition to two drive wheels 85 for engaging the extremities of track 46c best illustrated in FIGS. 20 and 21. As shown in FIGS. 18 and 19 power cylinder 93 mounted on the monotractor track of the crane section is adapted to actuate a male locating wedge 94 for engaging a female socket 95 in the storage extension of such track with a like unit adapted to establish alignment of the crane track with the main gate line.

Figure 24:
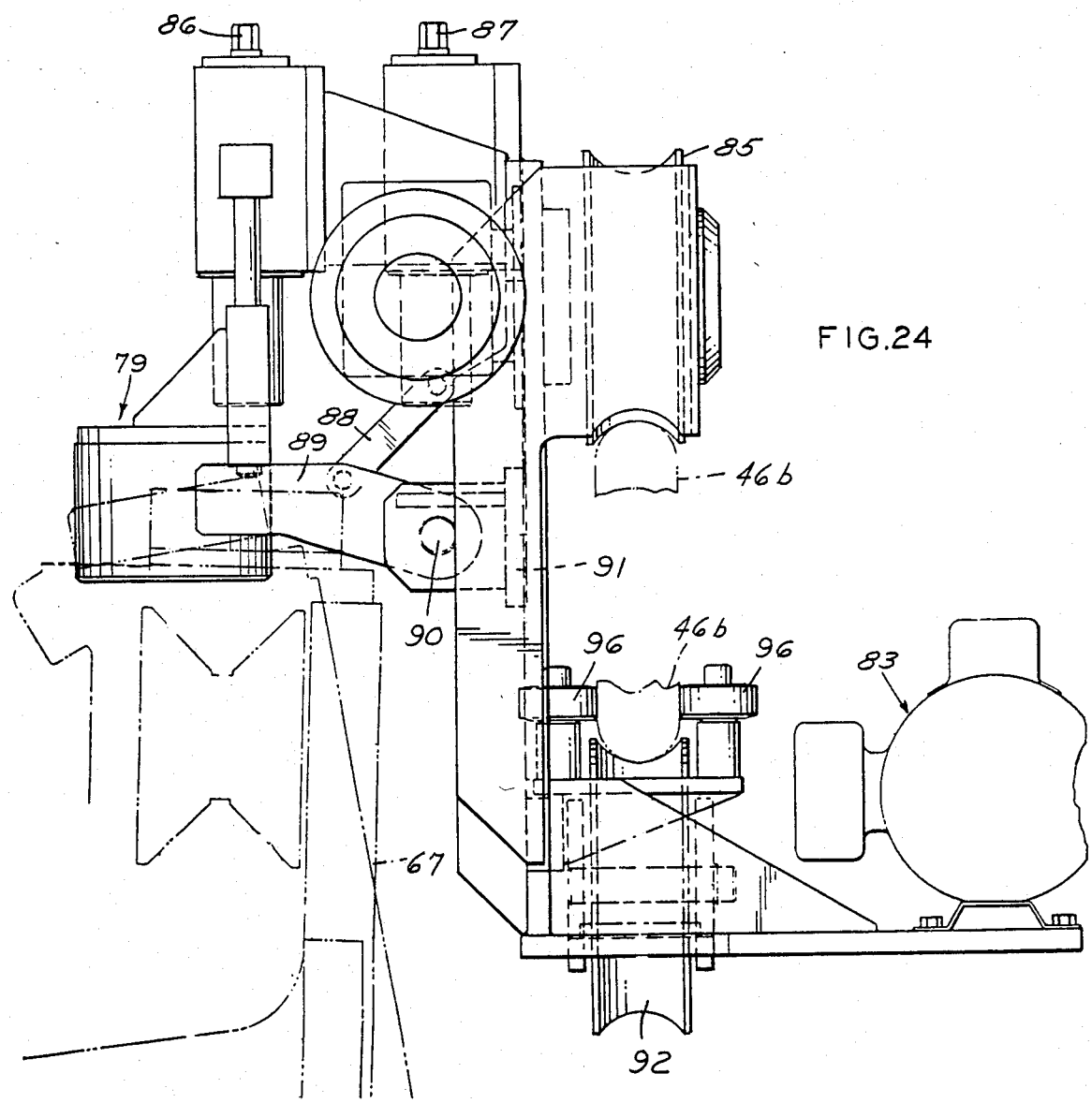
FIG. 24 is an end elevation of the monotractor taken along the line 24—24 of FIG. 22.
Figure 25:
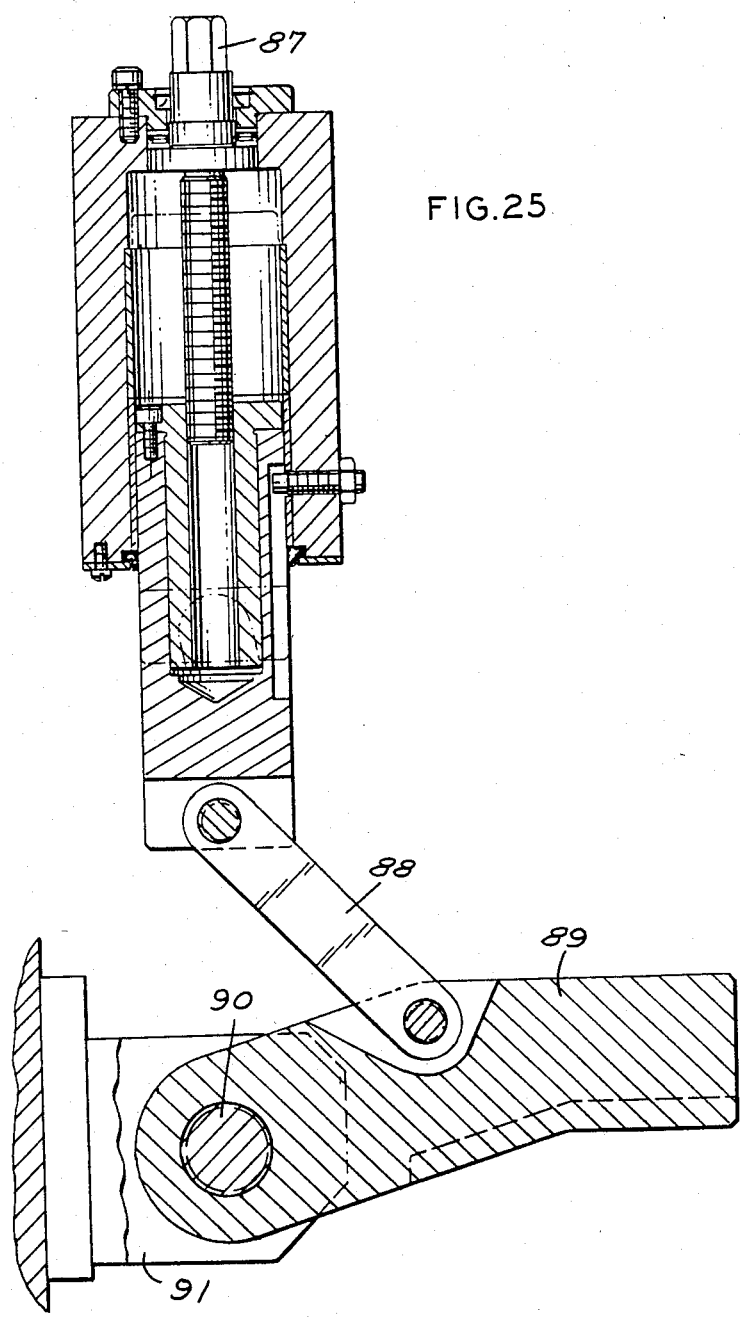
FIG. 25 is a fragmentary sectional view taken along the line 25—25 of FIG. 22.
Figure 26:
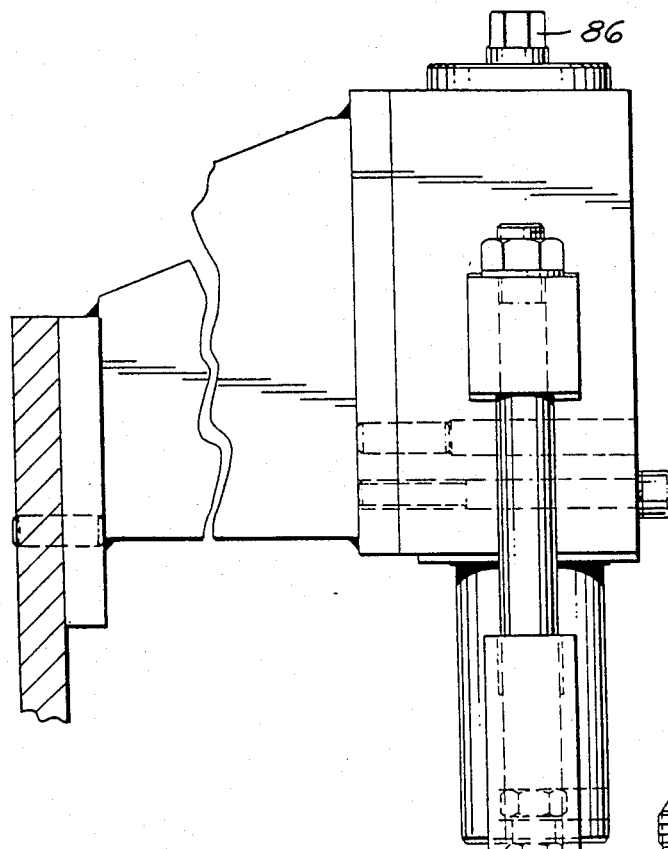
FIG. 26 is a fragmentary sectional view taken along the line 26—26 of FIG. 22.
Figure 27:
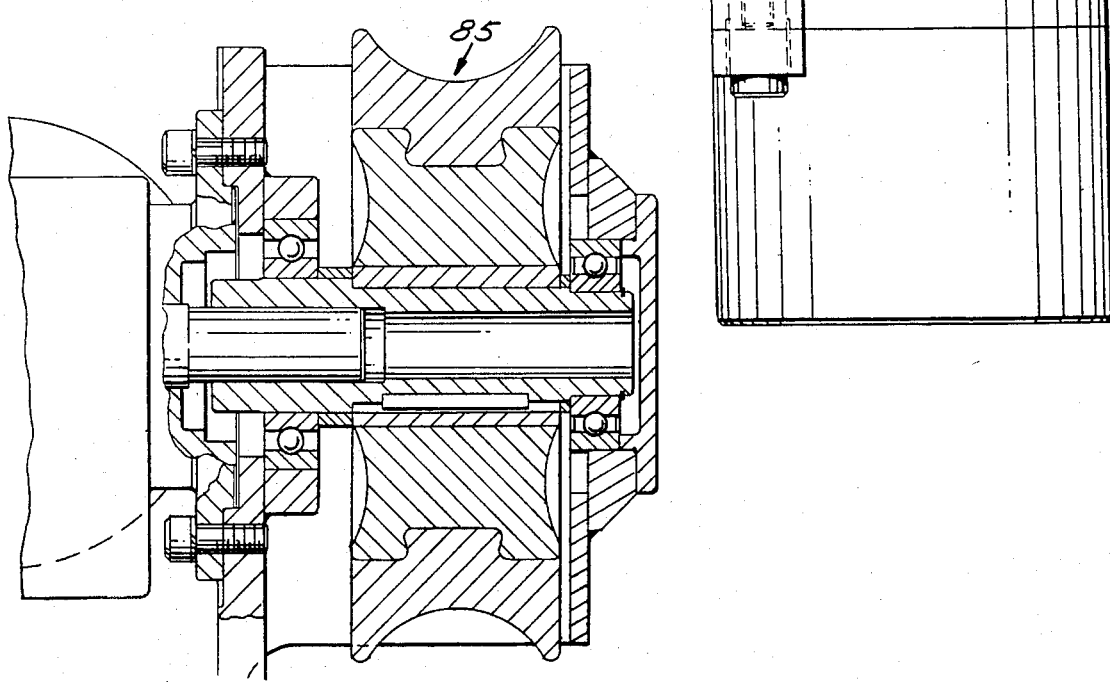
FIG. 27 is an enlarged fragmentary sectional view of one of the monotractor drive wheels shown in FIG. 24.

As illustrated in FIGS. 22 and 24 the monotractor is stabilized by guide rollers 96 engaging the lower end of the track.

In summary the operation steps and approximate time for completion are listed below:

| Step No. | Sequence of Operation | Time (seconds) |
|---|---|---|
| 1 | AIR COUPLING FROM MONO-TRACTOR ENGAGES IN GATE | 2 |
| 2 | SHUTTLE AIR AND ELECTRICAL COUPLING DISENGAGES FROM GATE | 2 |
| 3A | SHUTTLE GATE DRIVE PIN DISENGAGES | 1 |
| 3B | MONOTRACTOR GATE DRIVE PIN ENGAGES | |
| 4 | MONOTRACTOR DRIVES GATE TO CRANE POSITION | 12 |
| 5 | CRANE TRAVERSES | 12 |
| 6 | MONOTRACTOR DRIVES GATE TO STORAGE POSITION | 12 |
| 7A | MONOTRACTOR AIR COUPLING DISENGAGES | |
| 7B | GATE BALL LOCK ENGAGES | 2 |
| 7C | MONOTRACTOR DRIVE PIN DISENGAGES FROM GATE | |
| 8 | MONOTRACTOR TRAVELS TO STORED GATE POSITION | 20 |
| 9A | MONOTRACTOR AIR COUPLING ENGAGES IN STORED GATE | |
| 9B | MONOTRACTOR DRIVE PIN ENGAGES | 2 |
| 9C | GATE BALL LOCK RELEASES | |
| 10 | MONOTRACTOR DRIVES GATE TO CRANE POSITION | 12 |
| 11 | CRANE TRAVERSES | 12 |
| 12 | MONOTRACTOR DRIVES GATE TO SHUTTLE POSITION | 12 |
| 13A | SHUTTLE AIR AND ELECTRICAL COUPLING ENGAGES IN GATE | |
| 13B | SHUTTLE GATE DRIVE PIN ENGAGES | 2 |
| 14A | MONOTRACTOR AIR COUPLING DISENGAGES | |
| 14B | MONOTRACTOR DRIVE PIN DISENGAGES FROM GATE | 2 |
| | TOTAL CYCLE TIME | 1'45" |

The foregoing system has been illustrated and described with reference to a main car body welding assembly system such as disclosed in prior U.S. Pat. No. 4,162,387; however, it will be understood that the same basic system can be applied to subassemblies of a car body, such as side apertures, as in the case of prior U.S. Pat. No. 4,256,947. In essence a system employing three sets of reciprocable gates can, by the present invention, be expanded to four or five or any additional number of gates for use at a single framing station since either set of end gates may be exchanged while the other set is in use at the framing station. It is possible through proper scheduling to maintain the production rate of the earlier three gate system under the expanded five or more sets accommodated by the present system.

While the foregoing disclosure involves a five gate system with six robot welders illustrated at the framing station in accordance with prior installations, it is contemplated as earlier discussed that the system may be further expanded to accommodate more than five sets of gates by the addition of parallel storage tracks in the storage areas which may be serviced by the same monotractors and crane systems as disclosed herein. It is further contemplated that with newer types of electrical robots which have been developed recently, as many as ten robots may be employed at the framing station which could provide a total of eighty spot welds at a production rate of ninety car bodies per hour, representing an increase of sixteen spot welds, with maximum flexibility.

I claim:

1. Car body welding assembly system including a framing station having a plurality of aligned reciprocable gates adapted respectively to orient component parts of different body styles with programmable welding means adapted to weld any of said different body components into an integrated body structure, characterized by system means for interchanging different end gates to increase the number of different body styles capable of being welding at said framing station, said system means including automatic self-propelled monotractor means for releasably engaging an end gate to move it from its aligned end position to a crane area, automatic crane area means at said crane area adapted to move said end gate and monotractor means to a storage area, track means at said storage area adapted to receive and store said end gate as well as another substitute gate, automatic means for said monotractor to sequentially move said end gate into storage, release engagement, move to and engage said substitute gate, and move said substitute gate to said crane means for crane transfer to said framing line, and then move said substitute gate to said end gate position.

2. The assembly system of claim 1 including track means for said reciprocable gates, gate 60 drive means for selectively moving said plurality of gates between respective operative and standby positions along said track means, parallel monotractor track means, means at an end gate standby position for establishing drive coupling between said monotractor means and standby end gate, and means at said standby position for releasing the reciprocable gates drive means for said end gate.

3. The assembly system of claim 2 including releasable means for supplying air power to said end gate during said movement between operative and standby positions, a source of air power on said monotractor means, and means for supplying air power from said monotractor means to said end gate at the time said monotractor drive coupling is established whereby air power supply to said end gate may be maintained throughout drive transport by said monotractor means as well as movement between operative and standby positions.

4. The assembly system of claim 3 wherein said means for supplying air power from said monotractor means includes mechanical actuable air coupling means mounted on said monotractor means for establishing air power connection with said end gate, and automatic external means located at said end gate standby position for selectively actuating said mechanical means to effect air power coupling or release.

5. The assembly system of claim 4 wherein similar external means for selectively actuating said mechanical means to effect air power coupling or release is located at each gate storage area operable when said gate is in storage position and said monotractor means is in drive position relative thereto.

6. The assembly system of claim 4 wherein said monotractor mounted means includes an actuating cap screw and said external means comprises an automatic nut runner engageable therewith.

7. The assembly system of claim 3 wherein said releasable means for supplying air power to said end gate includes releasable means for also establishing electrical connections.

8. The assembly system of claim 7 wherein said releasable means includes composite male and female housings each incorporating cooperating engageable pneumatic and electrical connections.

9. The assembly system of claim 2 wherein said means for establishing said drive coupling includes drive coupling mechanism mounted on said monotractor means, actuable between engagement and release positions, and automatic external means located at said end gate standby position for selectively actuating said mechanism to effect gate drive engagement or release.

10. The assembly system of claim 9 wherein similar external means for selectively actuating said mechanism to effect drive engagement or release is located at each gate storage area operable when said gate is in storage position and said monotractor means is in drive position relative thereto.

11. The assembly system of claim 9 wherein said monotractor mounted mechanism includes an actuating cap screw and said external means comprises an automatic nut runner engageable therewith.

12. The assembly system of claim 2 wherein said crane means includes a track section for receiving said end gate and each storage area includes track sections to accommodate transfer of end gates from and to said crane means, and parallel track means are provided for said monotractor means at said standby position, on said crane means, and at each storage area.

13. The assembly system of claim 12 including power actuated tapered guide means adapted to precisely align said crane for gate and monotractor transfer at respective framing line and storage positions.

14. The assembly system of claim 12 wherein a gate storage track is provided for concurrent alignment with either end of said crane track.

15. The assembly system of claim 2 wherein said monotractor track means comprises a pair of vertically spaced rails adapted for respective drive and idler wheel engagement.

16. The assembly system of claim 15 wherein said monotractor means is equipped with a pair of longitudinally spaced electrically powered upper drive wheels and a single resiliently loaded lower idler wheel.

17. The assembly system of claim 15 wherein said rails are constructed with convex cross sectional curvature adapted for engagement by grooved monotractor driving and idling wheels.

18. The assembly system of claim 17 including stabilizing side guide wheels for engagement with lateral sides of the lower rail.

19. The assembly system of claim 2 wherein each gate is suspended from said track means on a pair of longitudinally spaced hangers accommodating lower lateral movement, and each gate storage location is provided with a guide track for leading the gate lower extremity to a fixed lateral storage position.

20. The assembly system of claim 19 including latch means for fixing the longitudinal storage position of each gate.

21. The assembly system of claim 2 wherein each end gate is suspended from track support on a pair of longitudinally spaced wheeled brackets, the upper end of each bracket being provided with a transversely slotted drive fitting for respective releasable drive engagement with said reciprocable gates drive and said monotractor means.

22. The assembly system of claim 1 wherein three pairs of aligned reciprocable gates are employed with system means for interchanging different end gates for either pair of end gates while the other pair is in operative position at the framing station.

* * * * *